United States Patent
Hayashi

(10) Patent No.: US 11,567,713 B2
(45) Date of Patent: Jan. 31, 2023

(54) PRINTER AND NON-TRANSITORY COMPUTER-READABLE RECORDING MEDIUM STORING COMPUTER-READABLE INSTRUCTIONS FOR PRINTER FOR REGISTERING PRINT SETTING INFORMATION RECEIVED FROM EXTERNAL DEVICE

(71) Applicant: BROTHER KOGYO KABUSHIKI KAISHA, Nagoya (JP)

(72) Inventor: Hiroyuki Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/165,200

(22) Filed: Feb. 2, 2021

(65) Prior Publication Data
US 2021/0240411 A1    Aug. 5, 2021

(30) Foreign Application Priority Data

Feb. 5, 2020 (JP) .............................. JP2020-018303
Jan. 28, 2021 (JP) .............................. JP2021-012465

(51) Int. Cl.
*G06F 3/12* (2006.01)

(52) U.S. Cl.
CPC .......... *G06F 3/1222* (2013.01); *G06F 3/1238* (2013.01); *G06F 3/1287* (2013.01)

(58) Field of Classification Search
None
See application file for complete search history.

(56) References Cited

U.S. PATENT DOCUMENTS

2020/0125301 A1    4/2020   Kaneda
2020/0319830 A1*  10/2020   Kaneda ................. G06F 3/1285

FOREIGN PATENT DOCUMENTS

JP    2004304826 A  * 10/2004
JP    2019-006099 A    1/2019
JP    2019-119089 A    7/2019

OTHER PUBLICATIONS

English translation of Japanese Application 2004-147830, corresponding to Japanese Application Publication 2004-304826. (Year: 2004).*

* cited by examiner

*Primary Examiner* — Thomas D Lee
(74) *Attorney, Agent, or Firm* — Scully, Scott, Murphy & Presser, PC

(57) ABSTRACT

The printer may receive first user identification information from an external device and receive a registration request including first print setting information from the external device. In a first case where the first user identification information and the registration request are received from the external device and registration related information associated with the first user identification information among the one or more user identification information in a memory is permission information, the printer may register the first print setting information included in the registration request in the memory in association with the first user identification information. In a second case where the first user identification information and the registration request are received from the external device and the registration related information associated with the first user identification information is restriction information, the first print setting information is not registered in the memory.

19 Claims, 21 Drawing Sheets

| User Name | Password | Print Condition Information ||| Registration Permission Flag | Authority | Registered Preset Name |
| | | One-sided | Two-sided | Monochrome | Color | | | |
|---|---|---|---|---|---|---|---|---|
| U1 | P1 | ON | ON | ON | ON | ON | Owner | DPR |
| U2 | P2 | ON | ON | ON | ON | ON | Guest | DPR, IPR1 |
| U3 | P3 | ON | OFF | ON | ON | ON | Guest | DPR |
| U4 | P4 | ON | ON | ON | OFF | OFF | Guest | DPR |
| ... | ... | ... | ... | ... | ... | ... | ... | ... |

40

| Preset Name | Print Setting Information ||
| | Print Type | Number of Colors |
|---|---|---|
| DPR | One-sided | Monochrome | ← PI1
| IPR1 | One-sided | Color | ← PI2
| ... | ... | ... |

(Third Embodiment)

(Third Embodiment)

FIG. 21

(Third Embodiment)

Print Setting

Preset Name: DPR (N31)

☑ One-sided  ☐ Two-sided

☐ Monochrome  ☑ Color

OK    Cancel

Preset Deletion

(Third Embodiment)

D32

Preset Name

DPR    Deletion

Cancel

PRINTER AND NON-TRANSITORY COMPUTER-READABLE RECORDING MEDIUM STORING COMPUTER-READABLE INSTRUCTIONS FOR PRINTER FOR REGISTERING PRINT SETTING INFORMATION RECEIVED FROM EXTERNAL DEVICE

CROSS-REFERENCE TO RELATED APPLICATION

This application claims priority to Japanese Patent Application No. 2020-018303, filed on Feb. 5, 2020, and Japanese Patent Application No. 2021-012465, filed on Jan. 28, 2021, the entire contents of which are hereby incorporated by reference into the present application.

TECHNICAL FIELD

The disclosure herein discloses a printer configured to register print setting information received from an external device.

BACKGROUND ART

An image forming system including a communication device and a multi-function peripheral (MFP) is known. A user who uses the communication device can register a print preset in the MFP according to Internet Printing Protocol (IPP).

SUMMARY

The above technique does not give any consideration to restricting registration of the print preset in the MFP. The disclosure herein provides art for restricting registration of print setting information.

A printer disclosed herein may comprise: a memory configured to store, for each of one or more user identification information, the user identification information and registration related information which is related to registration of print setting information in association with each other, the registration related information being either of permission information indicating that registration of the print setting information is permitted or restriction information indicating that registration of the print setting information is restricted; a communication interface; and a controller configured to: receive first user identification information from an external device via the communication interface; receive a registration request including first print setting information from the external device via the communication interface, the registration request being for requesting registration of print setting information to the memory; in a first case where the first user identification information and the registration request are received from the external device and the registration related information associated with the first user identification information among the one or more user identification information in the memory is the permission information, register the first print setting information included in the registration request in the memory in association with the first user identification information, wherein in a second case where the first user identification information and the registration request are received from the external device and the registration related information associated with the first user identification information in the memory is the restriction information, the first print setting information is not registered in the memory.

Another printer disclosed herein may comprise: a memory configured to store, for each of one or more user identification information, the user identification information and registration related information which is related to registration of print setting information in association with each other, the registration related information being either of permission information indicating that registration of the print setting information is permitted or restriction information indicating that registration of the print setting information is restricted; a communication interface; and a controller configured to: receive first user identification information from an external device via the communication interface; in a case where the first user identification information is received from the external device in a state where registration related information associated with the first user identification information is the restriction information, send a restriction request to the external device via the communication interface, the first user identification information being included in the one or more user identification information in the memory, and the restriction request being for requesting restriction on sending of a registration request for requesting registration of the print setting information to the memory, wherein in a case where the first user identification information is received from the external device in a state where the registration related information associated with the first user identification information in the memory is the permission information, the restriction request is not sent; receive the registration request including first print setting information from the external device via the communication interface in the state where the registration related information associated with the first user identification information in the memory is the permission information; and in a first case where the first user identification information and the registration request are received from the external device and the registration related information associated with the first user identification information in the memory is the permission information, register the first print setting information included in the registration request to the memory in association with the first user identification information, wherein in a second case where the first user identification information is received from the external device and the registration related information associated with the first user identification information in the memory is the restriction information, the first print setting information is not registered to the memory.

Control methods, computer programs, and computer-readable recording media storing the computer programs for realizing the above printers are also novel and useful. Further, communication systems comprising the above printers and external device are also novel and useful.

BRIEF DESCRIPTION OF THE DRAWINGS

FIG. 2 show respective tables.

FIG. 21 shows an example of screen displayed on a PC in the third embodiment.

FIG. 22 shows an example of screen displayed on a PC in the third embodiment.

EMBODIMENTS

Figure 1:
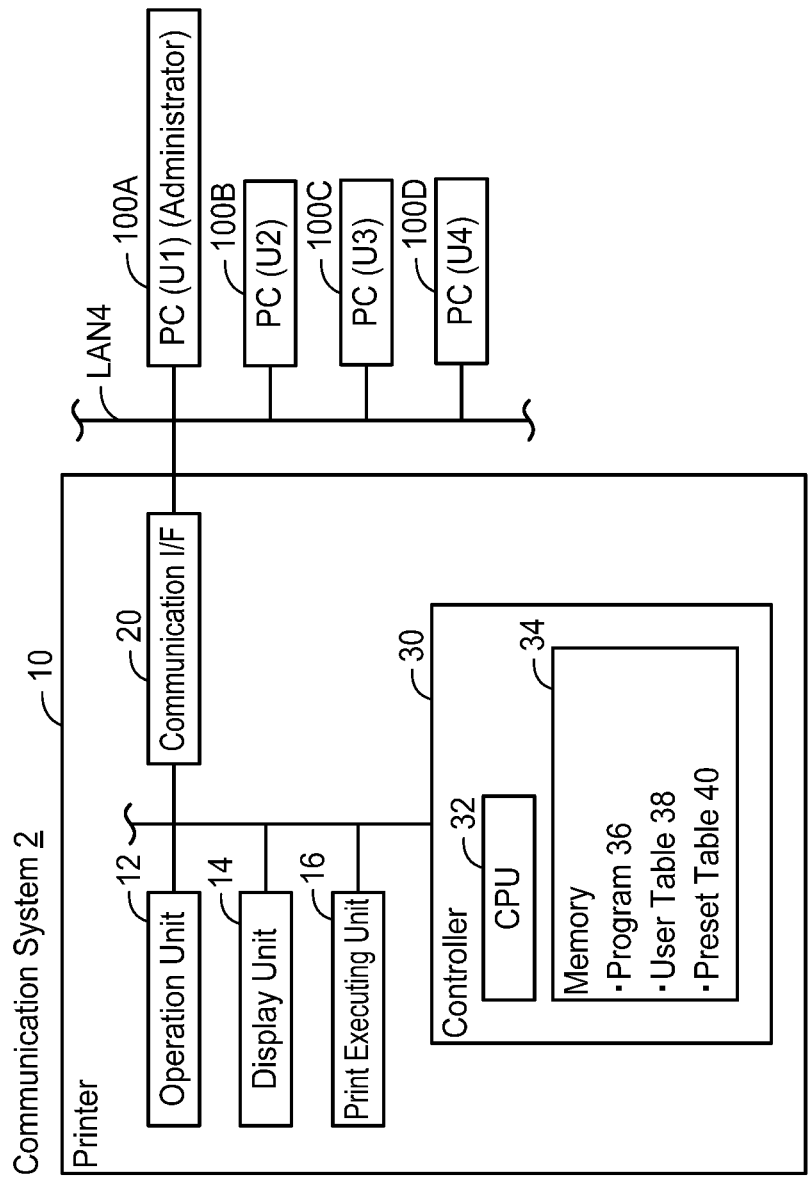
FIG. 1 shows a configuration of a communication system.

First Embodiment (Configuration of Communication System 2; FIG. 1)

As shown in FIG. 1, a communication system 2 is provided with a printer 10 and a plurality of PCs 100A to 100D. The printer 10 and the PCs 100A to 100D belong to the same Local Area Network (LAN) 4 and are configured to communicate with each other via the LAN 4.

(Configuration of Printer 10)

The printer 10 is a peripheral device (i.e., a peripheral device of the PCs 100A to 100D) configured to execute a print function. The printer 10 is further configured to execute a web server function. The web server function is a function of sending webpage data representing a webpage to an external device in response to the external device accessing a web server in the printer 10. The printer 10 may be a multi-function peripheral configured to execute, in addition to the above functions, a scan function, a FAX function, and/or the like. The printer 10 is provided with an operation unit 12, a display unit 14, a print executing unit 16, a communication interface (hereinbelow, an interface will be denoted "I/F") 20, and a controller 30.

The operation unit 12 is provided with a plurality of keys. A user can input various instructions to the printer 10 by operating the operation unit 12. The display unit 14 is a display for displaying various types of information. The display unit 14 also functions as a so-called touch screen (i.e., an operation unit). The print executing unit 16 is a print mechanism of an inkjet scheme, a laser scheme, or the like. The communication I/F 20 is connected to the LAN 4. The communication I/F 20 may be a wireless I/F or a wired I/F.

The controller 30 is provided with a CPU 32 and a memory 34. The CPU 32 is configured to execute various processes according to a program 36 stored in the memory 34. The memory 34 is configured of a volatile memory, a nonvolatile memory, and the like. The memory 34 stores a user table 38 and a preset table 40.

(Configurations of PCs 100A to 100D)

The PC 100A is used by an administrator of the printer 10. The PCs 100B to 100D are used by users different from the administrator of the printer 10. The PCs 100A, 100B, 100C, and 100D respectively store user names "U1", "U2", "U3", and "U4" for identifying the users using the respective PCs.

Each of the PCs 100A to 100D is provided with an Internet Printing Protocol (IPP) program (not shown) installed from a server on the Internet. Each IPP program is a program for creating an IPP command according to Hyper Text Transfer Protocol (HTTP) and sending the command to the printer 10. In the present embodiment, the aforementioned server is provided by a business entity different from a vendor of the printer 10. However, in a variant, the aforementioned server may be provided by the vendor of the printer 10. Each of the PCs 100A to 100D may originally support IPP without installing the IPP program from the server.

(Contents of Tables 38, 40; FIG. 2)

Next, contents of the user table 38 and the preset table 40 in the printer 10 will be described with reference to FIG. 2.

The user table 38 stores, for each of one or more users who use the printer 10, a user name, a password, print condition information, a registration permission flag, authority information, and a registered preset name in association with each other. All the information other than the registered preset name is registered by the administrator of the printer 10. The user name and the password are information used for authentication of each user. The print condition information is information indicating whether the user is permitted to use print conditions which the printer 10 can execute, namely "one-sided", "two-sided", "monochrome", and "color". "One-sided" and "two-sided" respectively mean one-sided printing and two-sided printing. "Monochrome" and "color" respectively mean monochrome printing and color printing. "ON" or "OFF" is assigned to each print condition. "ON" indicates that the user is permitted to use the print condition, while "OFF" indicates that the user is not permitted to use the print condition. Hereinbelow, a print condition assigned with "ON" may be termed "permitted print condition", and a print condition assigned with "OFF" may be termed "restricted print condition".

The registration permission flag indicates a value which is one of "ON" indicating that registration of preset information (to be described later) is permitted and "OFF" indicating that registration of preset information is restricted. The authority information indicates one of "Owner" and "Guest". "Owner" is information indicating the administrator of the printer 10, and "Guest" is information indicating a user different from the administrator of the printer 10, that is, a general user (in other words, individual user). The registered preset name is information for identifying preset information to be described later.

The preset table 40 stores one or more preset information. Each preset information includes a preset name and print setting information. The print setting information includes a print condition (i.e., "one-sided" or "two-sided") corresponding to a print setting item "print type" and a print condition (i.e., "monochrome" or "color") corresponding to a print setting item "number of colors". In a variant, the print setting information may include other print setting item(s) (e.g., image quality, paper size, paper type, number of printed sheets, postprocess, etc.). Further, the print setting information may not include one of the print setting item "print type" and the print setting item "number of colors". Preset information PI1 including a preset name "DPR" is default preset information registered in the preset table 40 in advance.

Figure 3:
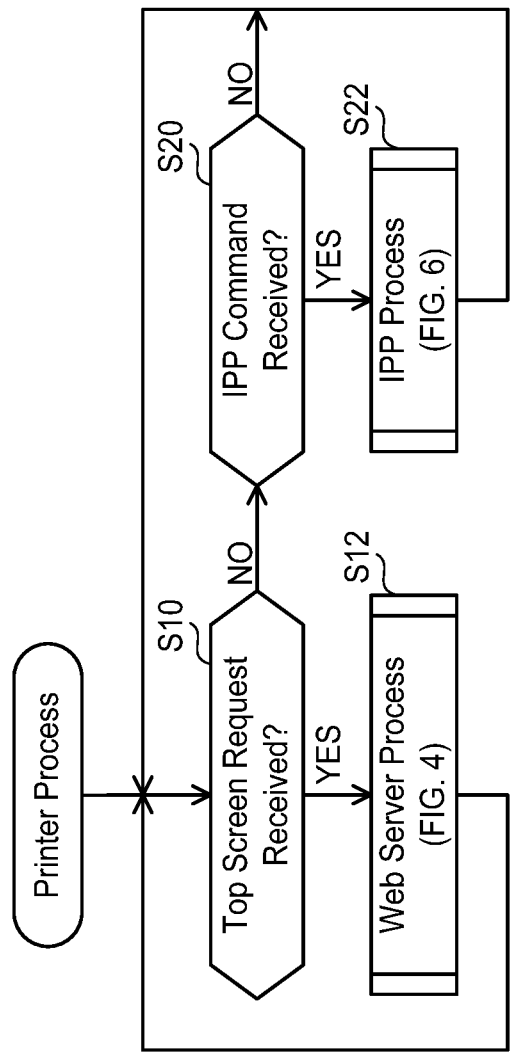
FIG. 3 shows a flowchart of a printer process according to first to third embodiments.

(Printer Process; FIG. 3)

Next, a printer process executed by the CPU 32 of the printer 10 will be described with reference to FIG. 3. The process of FIG. 3 is started when power of the printer 10 is turned on. All of below-described communication executed by the printer 10 are executed via the communication I/F 20. As such, the phrase "via the communication I/F 20" will be omitted hereinbelow.

In S10, the CPU 32 monitors receipt of a top screen request from a PC. The top screen request is a command for requesting sending of top screen data for displaying a top screen, and is a GET command according to HTTP. The CPU 32 proceeds to S12 in a case of receiving the top screen request from a PC (YES in S10).

Figure 4:
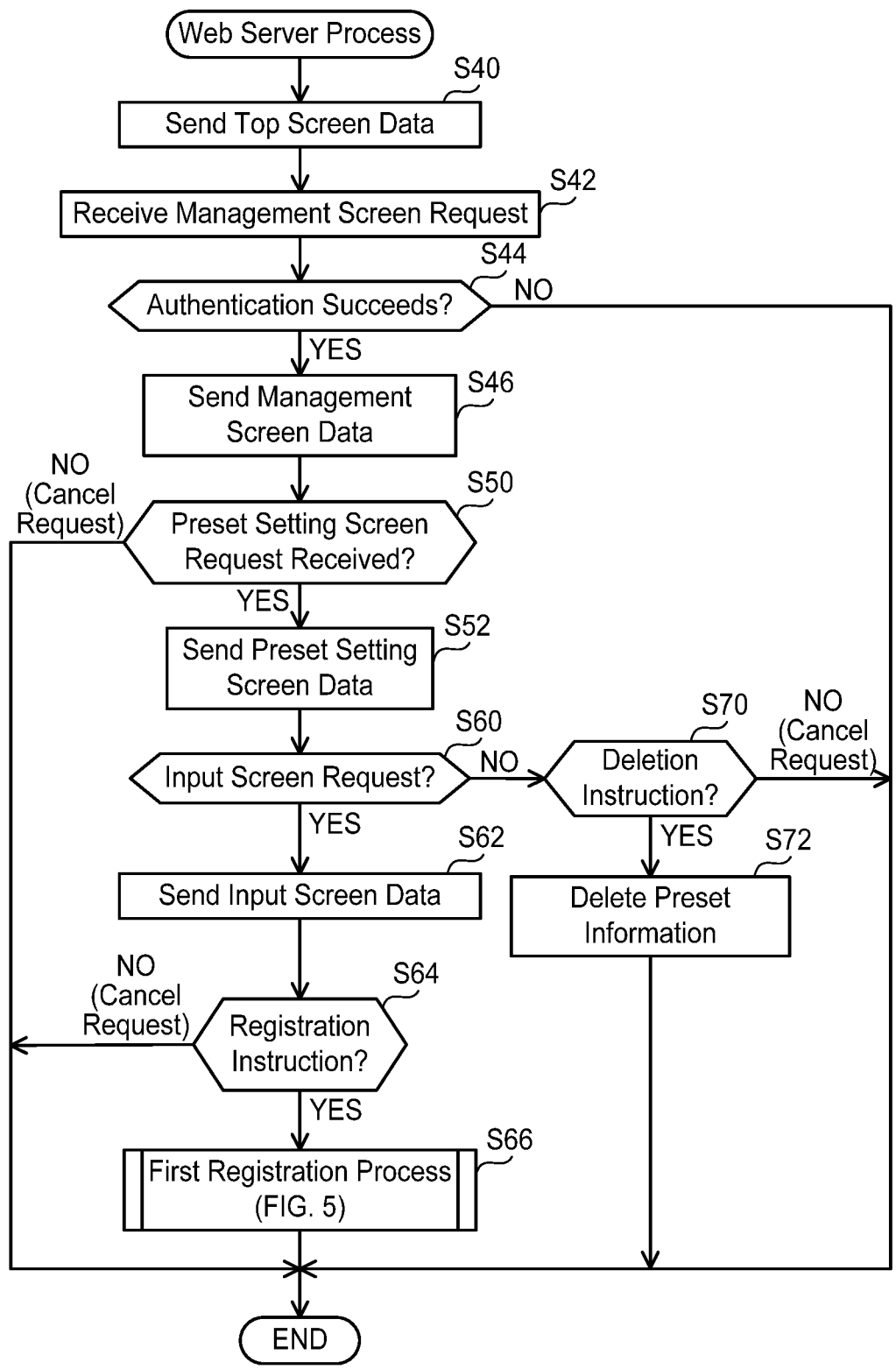
FIG. 4 shows a flowchart of a web server process according to the first and second embodiments.

In S12, the CPU 32 executes a web server process (FIG. 4). The web server process is a process for the printer 10 to function as a web server. When S12 is completed, the CPU 32 returns to S10.

At the same time as the monitoring of S10, the CPU 32 monitors receipt of an IPP command from a PC in S20. The CPU 32 proceeds to S22 in a case of receiving an IPP command from a PC (YES in S20).

Figure 6:
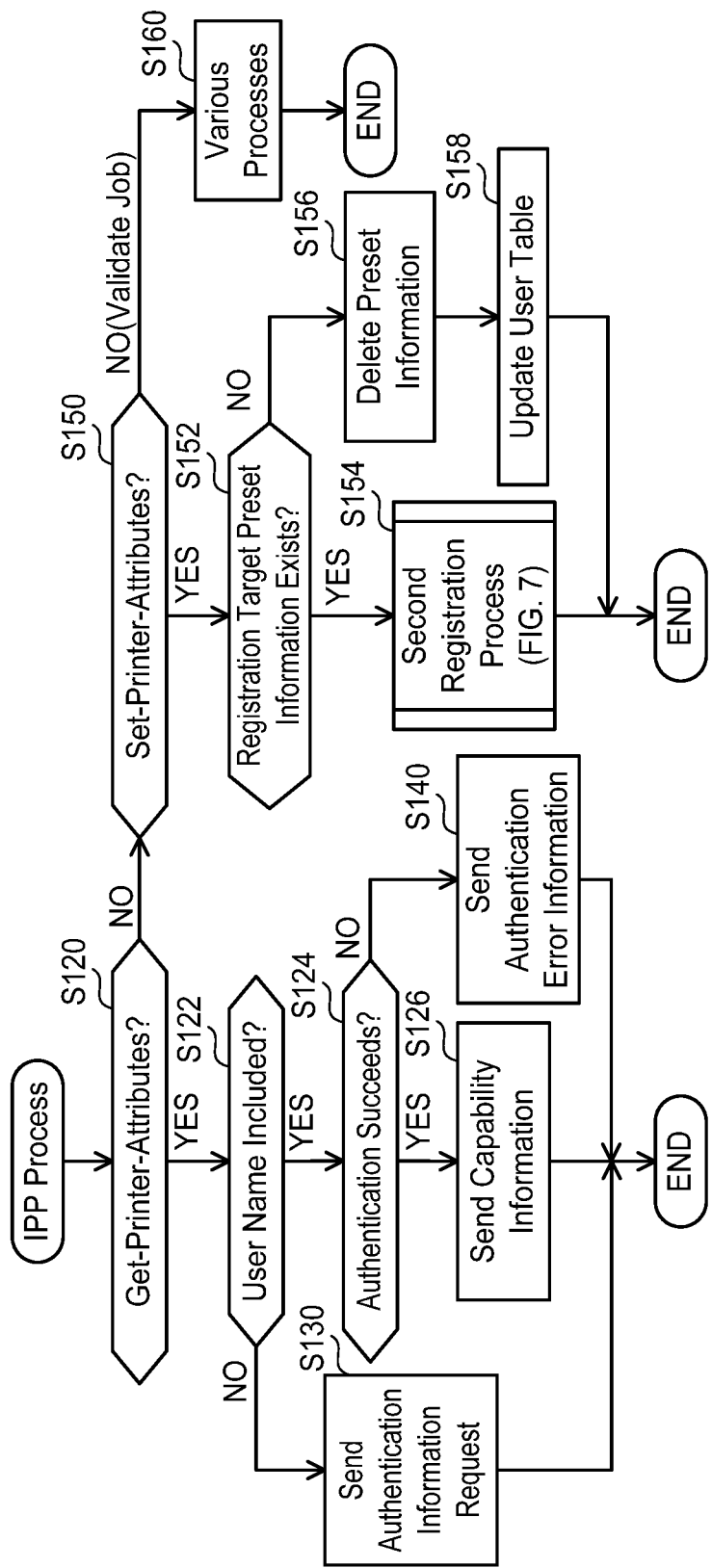
FIG. 6 shows a flowchart of an IPP process according to the first and second embodiments.

In S22, the CPU 32 executes an IPP process (FIG. 6). The IPP process is a process for executing communication according to IPP to register or delete preset information into/from the preset table 40. When S22 is completed, the CPU 32 returns to S10.

(Web Server Process; FIG. 4)

Next, the web server process executed in S12 of FIG. 3 will be described with reference to FIG. 4. In S40, the CPU 32 sends the top screen data for displaying the top screen to the PC. The top screen is a screen for allowing a user to input a user name and a password.

In S42, the CPU 32 receives a management screen request including a user name and a password from the PC. The management screen request is a GET command according to HTTP and is sent from the PC in response to a user name and a password being inputted to the top screen displayed on the PC.

In S44, the CPU 32 executes user authentication using the user name and the password in the management screen request. The CPU 32 determines YES in S44 and proceeds to S46 in a case where the combination of the user name and the password in the management screen request is registered in the user table 38, that is, in a case where the user authentication succeeds. Hereinbelow, the user name for which the user authentication succeeded will be termed "authenticated user name" On the other hand, the CPU 32 determines NO in S44 and terminates the process of FIG. 4 in a case where the combination of the user name and the password in the management screen request is not registered in the user table 38, that is, in a case where the user authentication fails.

Figure 13:
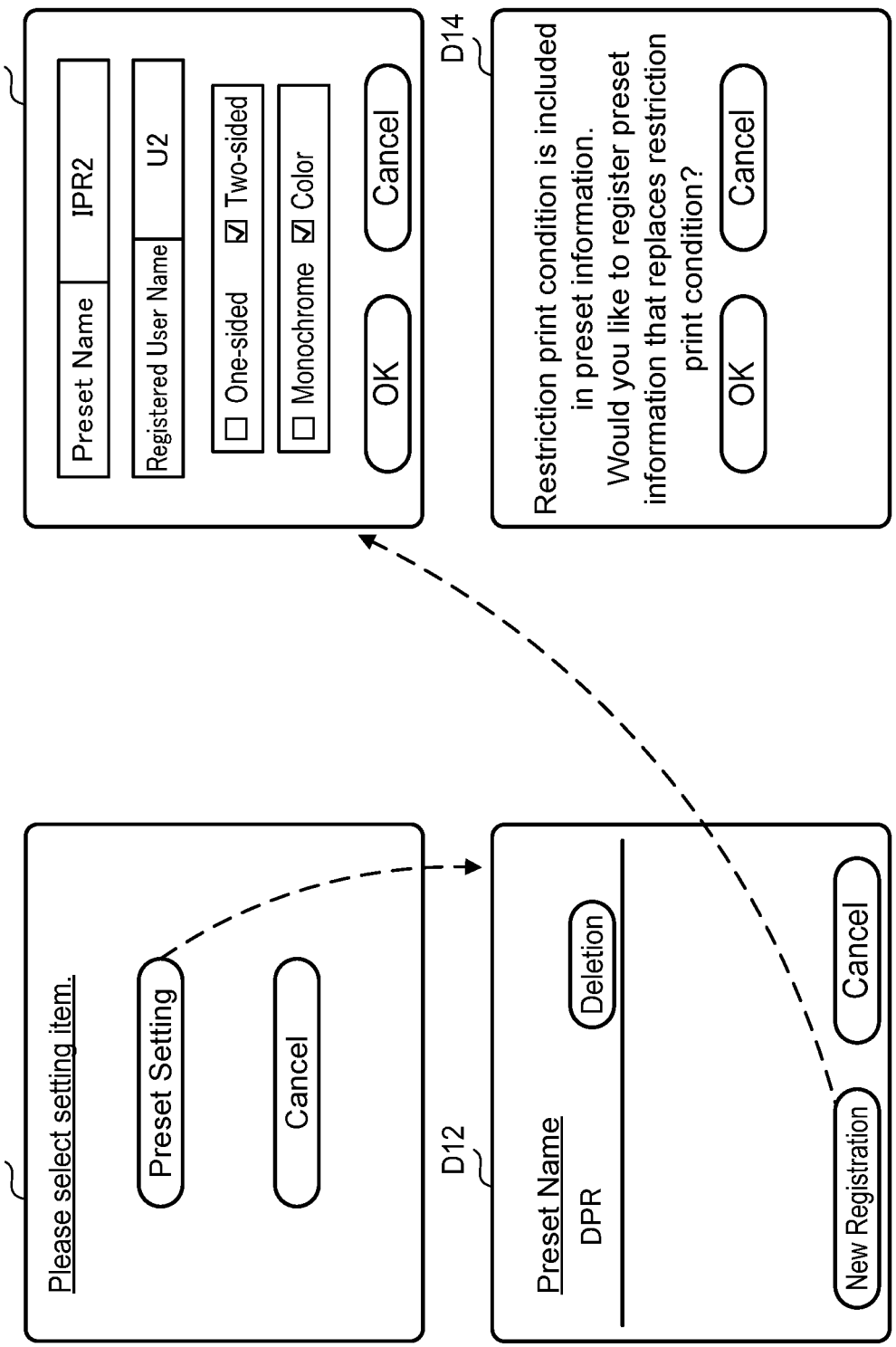
FIG. 13 shows examples of screens displayed on a PC in the first and second embodiments.

In S46, the CPU 32 sends management screen data for displaying a management screen D11 to the PC. As shown in FIG. 13, the screen D11 includes a preset setting button and a cancel button.

In S50, the CPU 32 monitors receipt of a preset setting screen request from the PC. The preset setting screen request is a GET command according to HTTP and is sent from the PC in response to the preset setting button in the management screen D11 being selected. The CPU 32 proceeds to S52 in a case where the preset setting screen request is received from the PC (YES in S50). On the other hand, the CPU 32 terminates the process of FIG. 4 in a case where a cancel request is received from the PC (NO in S50). The cancel request is sent from the PC in response to the cancel button in the management screen D11 being selected.

In S52, the CPU 32 sends preset setting screen data for displaying a preset setting screen D12 to the PC. As shown in FIG. 13, the screen D12 is a screen in which for each of the one or more preset names associated with the authenticated user name in the user table 38, the preset name and a deletion button corresponding to the preset name are associated to each other. The screen D12 further includes a new registration button and a cancel button. In a variant, the screen D12 may be a screen in which for each of the one or more preset names registered in the preset table 40, the preset name and a deletion button corresponding to the preset name are associated to each other.

In S60, the CPU 32 monitors receipt of an input screen request from the PC. The input screen request is a GET command according to HTTP and is sent from the PC in response to the new registration button in the preset setting screen D12 displayed on the PC being selected. The CPU 32 proceeds to S62 in a case of receiving the input screen request from the PC (YES in S60). On the other hand, the CPU 32 proceeds to S70 in a case of not receiving the input screen request from the PC (NO in S60).

In S62, the CPU 32 sends input screen data for displaying an input screen D13 to the PC. As shown in FIG. 13, the screen D13 includes a preset name input box for input of a preset name, a registration user name input box for input of a registration-target user name to be registered, four checkboxes corresponding to the four print conditions (i.e., "one-sided", "two-sided", "monochrome", and "color"), an OK button, and a cancel button. The registration-target user name may be the same as the authenticated user name or may be different therefrom.

In S64, the CPU 32 determines whether or not a registration instruction including preset information and a registration-target user name has been received from the PC. Here, this preset information includes the preset name inputted to the preset name input box in the input screen D13 displayed on the PC and the print conditions checked in the input screen D13. Further, the registration-target user name is the user name inputted to the registration user name input box in the input screen D13. The registration instruction is a POST command according to HTTP and is sent from the PC in response to the OK button in the input screen D13 being selected. The CPU 32 proceeds to S66 in a case of receiving the registration instruction from the PC (YES in S64). On the other hand, the CPU 32 terminates the process of FIG. 4 in a case of receiving a cancel request from the PC (NO in S64). This cancel request is sent from the PC in response to the cancel button in the input screen D13 being selected. Hereinbelow, the preset information and the registration-target user name included in the registration instruction will respectively be termed "target preset information" and "target registration user name".

Figure 5:
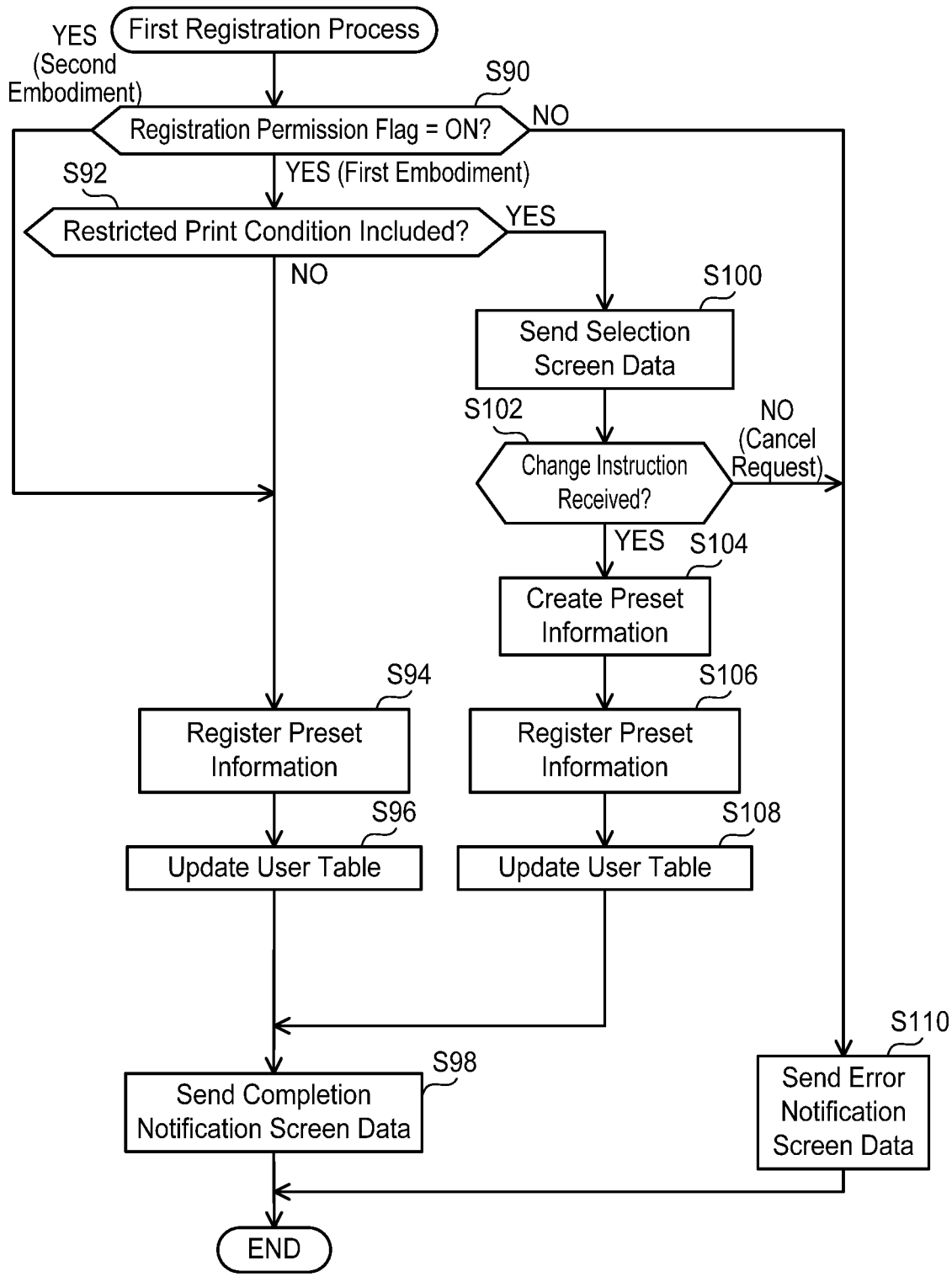
FIG. 5 shows a flowchart of a first registration process according to the first and second embodiments.

In S66, the CPU 32 executes a first registration process (FIG. 5). The first registration process is a process for registering the target preset information included in the registration instruction to the preset table 40. When S66 is completed, the CPU 32 terminates the process of FIG. 4.

In S70, the CPU 32 determines whether or not a deletion instruction including a preset name has been received from the PC. The deletion instruction is sent in response to the deletion button in the preset setting screen D12 displayed on the PC being selected. The CPU 32 proceeds to S72 in a case of receiving the deletion instruction from the PC (YES in S70). On the other hand, the CPU 32 terminates the process of FIG. 4 in a case of receiving a cancel request from the PC (NO in S70). This cancel request is sent from the PC in response to the cancel button in the preset setting screen D12 being selected.

In S72, the CPU 32 deletes from the preset table 40 the preset information including the preset name included in the deletion instruction received in S70. When S72 is completed, the CPU 32 terminates the process of FIG. 4.

(First Registration Process; FIG. 5)

Next, the first registration process executed in S66 of FIG. 4 will be described with reference to FIG. 5. In S90, the CPU 32 determines whether or not the registration permission flag associated with the authenticated user name is "ON" in the user table 38. The CPU 32 proceeds to S92 in a case where the registration permission flag is "ON" (YES in S90). On the other hand, the CPU 32 proceeds to S110 in a case where the registration permission flag is "OFF" (NO in S90).

In S92, the CPU 32 determines whether or not a restricted print condition is included in the print setting information in the target preset information included in the registration instruction received in S64 of FIG. 4. Specifically, the CPU 32 firstly identifies in the user table 38 a restricted print condition (i.e., a print condition indicating "OFF") associated with the target registration user name in the registration instruction. Then, the CPU 32 determines whether or not the identified restricted print condition is included in the print setting information in the target preset information. The CPU 32 proceeds to S94 in a case where the identified restricted print condition is not included in the print setting information in the target preset information (NO in S92). On the other hand, the CPU 32 proceeds to S100 in a case where the identified restricted print condition is included in the print setting information in the target preset information (YES in S92).

In S94, the CPU 32 registers the target preset information (i.e., the preset name and the print setting information) in the preset table 40.

In S96, the CPU 32 registers the preset name in the target preset information as a registered preset name associated with the target registration user name in the user table 38.

In S98, the CPU 32 sends to the PC completion notification screen data for displaying a completion notification screen including a message that the registration of the preset information has been completed. When S98 is completed, the CPU 32 terminates the process of FIG. 5.

In S100, the CPU 32 sends selection screen data for displaying a selection screen D14 to the PC. As shown in FIG. 13, the screen D14 includes a message that the restricted print condition is included in the target preset information, a message that asks whether or not preset information in which the restricted print condition is replaced is to be registered, an OK button, and a cancel button.

In S102, the CPU 32 determines whether or not a change instruction has been received from the PC. The change instruction is a POST command according to HTTP and is sent from the PC in response to the OK button in the selection screen D14 displayed on the PC being selected. The CPU 32 proceeds to S104 in a case of receiving the change instruction from the PC (YES in S102). On the other hand, the CPU 32 proceeds to S110 in a case of receiving a cancel request from the PC (NO in S102). This cancel request is sent from the PC in response to the cancel button in the selection screen D14 being selected.

In S104, the CPU 32 deletes the restricted print condition included in the print setting information in the target preset information to create new preset information. Specifically, the CPU 32 firstly identifies in the user table 38 a permitted print condition (i.e., a print condition indicating "ON") associated with the target registration user name. For example, in a case where the print setting item of the restricted print condition included in the print setting information in the target preset information is "print type", the CPU 32 creates new preset information by replacing the restricted print condition (e.g., "two-sided") with the identified permitted print condition (e.g., "one-sided") corresponding to "print type". Further, for example, in a case where the print setting item of the restricted print condition included in the print setting information in the target preset information is "number of colors", the CPU 32 creates new preset information by replacing the restricted print condition (e.g., "color") with the identified permitted print condition (e.g., "monochrome") corresponding to "number of colors".

In S106, the CPU 32 registers the preset information created in S104 to the preset table 40. S108 is the same as S96.

In S110, the CPU 32 sends to the PC error notification screen data for displaying an error notification screen including a message that the registration of the preset information failed. When S110 is completed, the CPU 32 terminates the process of FIG. 5.

(IPP Process; FIG. 6)

Next, the IPP process executed in S22 of FIG. 3 will be described with reference to FIG. 6. In S120, the CPU 32 determines whether or not the IPP command received in S20 of FIG. 3 is a Get-Printer-Attributes command (hereinbelow termed "GPA"). The GPA is a command that requests the printer 10 to send capability information. The CPU 32 proceeds to S122 in a case where the IPP command is a GPA (YES in S120). On the other hand, the CPU 32 proceeds to S150 in a case where the IPP command is not a GPA (NO in S120).

In S122, the CPU 32 determines whether or not a user name and a password are included in the GPA. The CPU 32 proceeds to S124 in a case where a user name and a password are included in the GPA (YES in S122). On the other hand, the CPU 32 proceeds to S130 in a case where a user name and a password are not included in the GPA (NO in S122). In S130, the CPU 32 sends to the PC an authentication information request for displaying an authentication screen on the PC. The authentication screen is a screen for allowing the user to input a user name and a password. When S130 is completed, the CPU 32 terminates the process of FIG. 6.

S124 is the same as S44 of FIG. 4 except that the user name and the password in the GPA are used.

In S126, the CPU 32 sends capability information to the PC. Specifically, the CPU 32 firstly identifies in the user table 38 a preset name associated with the same user name as the user name in the GPA. Then, the CPU 32 identifies in the preset table 40 preset information including the identified preset name. Next, the CPU 32 sends to the PC capability information including all the print conditions which the printer 10 can execute (i.e., "one-sided", "two-sided", "monochrome", and "color") and the identified preset information. In a variant, the printer 10 may send to the PC capability information including all the print conditions which the printer 10 can execute and may send to the PC the identified preset information separately from the capability information.

In S140, the CPU 32 sends to the PC authentication error information for displaying an error notification screen including a message that the user authentication failed on the PC. When S140 is completed, the CPU 32 terminates the process of FIG. 6.

In S150, the CPU 32 determines whether or not the IPP command received in S20 of FIG. 3 is a Set-Printer-Attributes command (hereinbelow termed "SPA"). The SPA is a command that requests the printer 10 to register or delete preset information. The SPA is sent from the PC after the capability information has been sent to the PC (S126) as a result of the user authentication having succeeded (YES in S124). The SPA includes the user name for which the authentication succeeded. The CPU 32 proceeds to S152 in a case where the IPP command is an SPA (YES in S150). On the other hand, the CPU 32 proceeds to S160 in a case where the IPP command is not an SPA (NO in S150). In the case where it is determined NO in S150, the IPP command is a Validate-Job command (hereinbelow termed "VJ") or the like.

In S152, the CPU 32 determines whether or not registration-target preset information is included in the SPA. The CPU 32 identifies one or more preset information associated with the user name included in the SPA from the user table 38. Then, in a case where there is preset information that is included in the SPA but not included in the identified one or more preset information, the CPU 32 identifies this preset information as registration-target preset information, determines YES in S152, and proceeds to S154. On the other hand, in a case where there is preset information that is included in the identified one or more preset information but not included in the SPA, the CPU 32 identifies this preset information as deletion-target preset information, determines NO in S152, and proceeds to S156.

Figure 7:
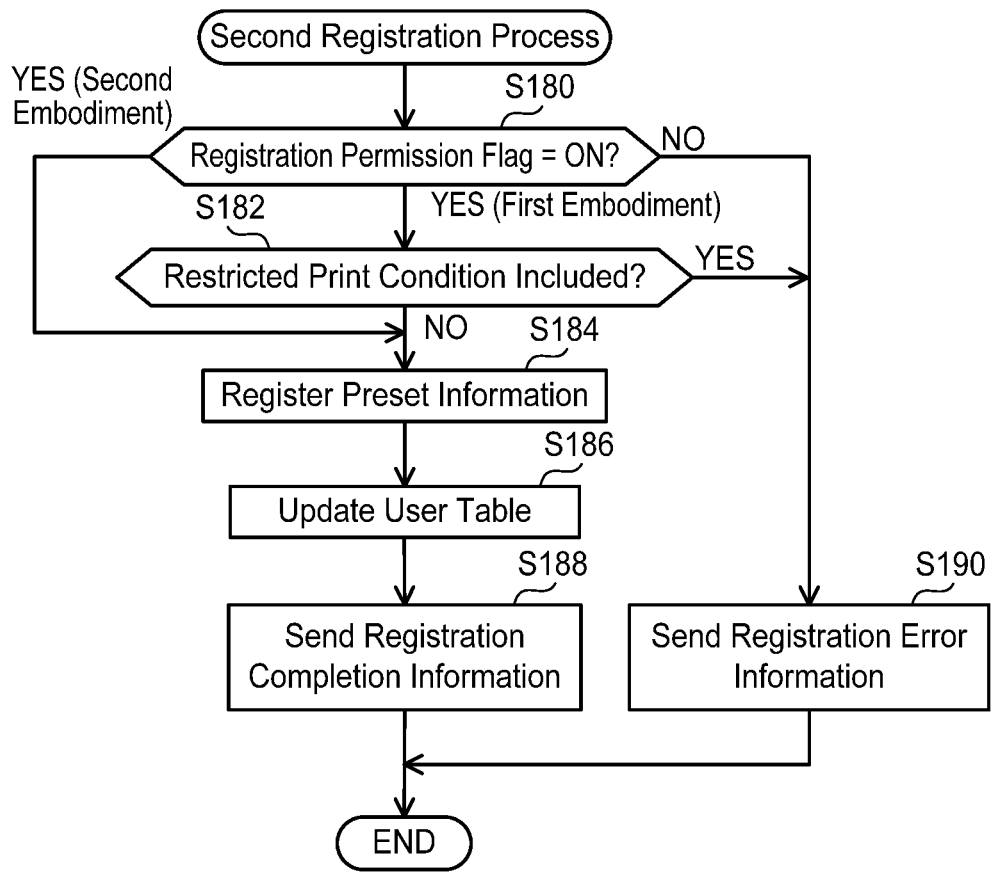
FIG. 7 shows a flowchart of a second registration process according to the first and second embodiments.

In S154, the CPU 32 executes a second registration process (FIG. 7). The second registration process is a process for registering the preset information identified in S152 as a registration target to the preset table 40. When S154 is completed, the CPU 32 terminates the process of FIG. 6.

In S156, the CPU 32 deletes the preset information identified in S152 as a deletion target from the preset table 40.

In S158, the CPU 32 deletes from the user table 38 the preset name corresponding to the preset information deleted in S156. When S158 is completed, the CPU 32 terminates the process of FIG. 6.

In S160, the CPU 32 executes various processes according to IPP. When S160 is completed, the CPU 32 terminates the process of FIG. 6.

(Second Registration Process; FIG. 7)

Next, the second registration process executed in S154 of FIG. 6 will be described with reference to FIG. 7. S180 and S182 are the same as S90 and S92 of FIG. 5 except that the user name in the SPA is used. The CPU 32 proceeds to S182 in a case of determining YES in S180, while it proceeds to S190 in a case of determining NO in S180. Further, the CPU 32 proceeds to S184 in a case of determining NO in S182, while it proceeds to S190 in a case of determining YES in S182. S184 and S186 are the same as S94 and S96 except that the preset information in the SPA of FIG. 6 is used. In S188, the CPU 32 sends to the PC registration completion information for displaying a completion notification screen including a message that the registration of the preset information has been completed on the PC. In S190, the CPU 32 sends to the PC registration error information for displaying an error notification screen including a message that the registration of the preset information failed on the PC. When S188 or S190 is completed, the CPU 32 terminates the process of FIG. 7.

(Specific Cases A to E; FIGS. 8 to 11)

Specific Cases A to E realized by the processes of FIGS. 3 to 7 will be described with reference to FIGS. 8 to 11.

Figure 8:
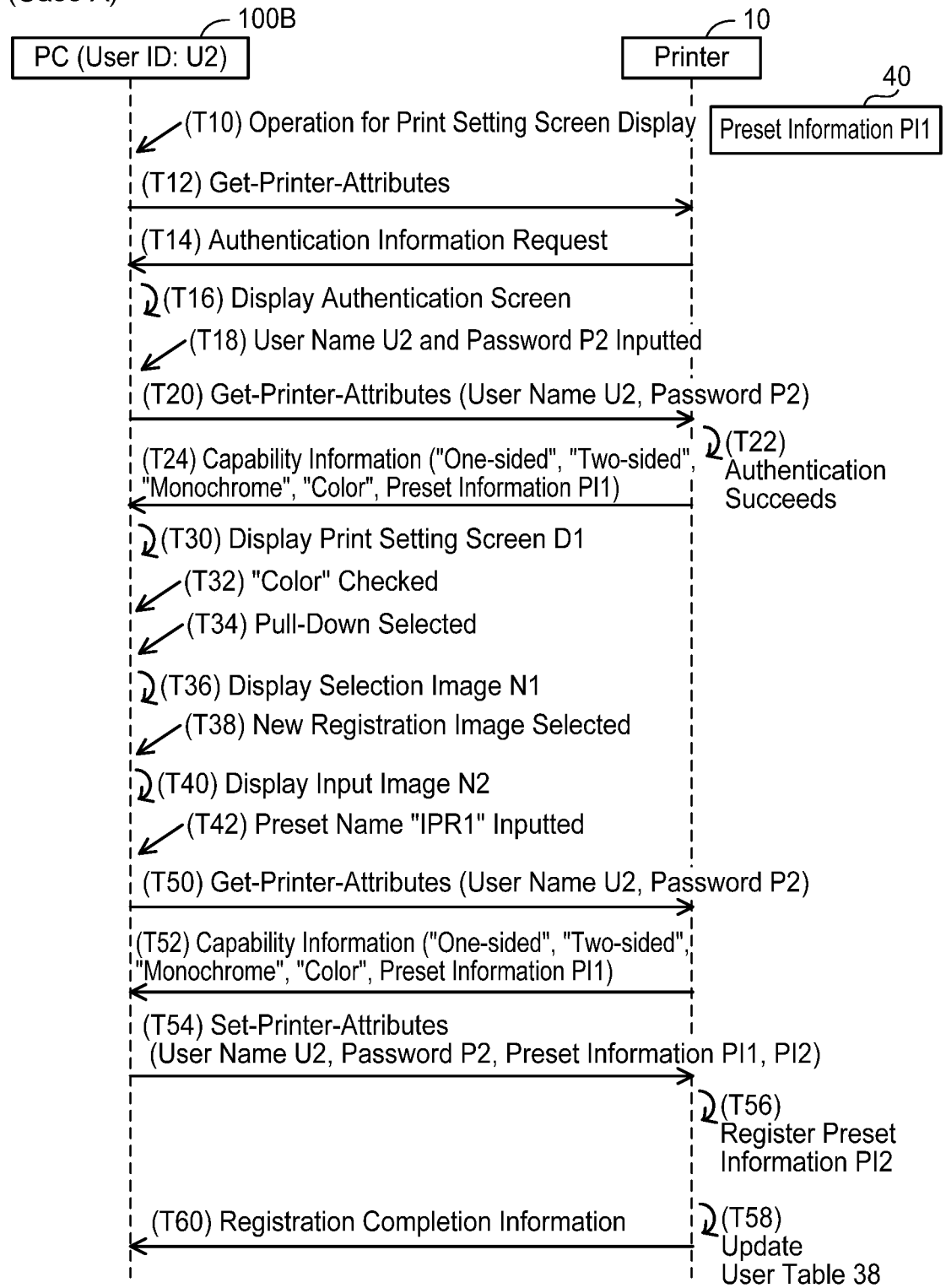
FIG. 8 shows a sequence diagram of Case A in which preset information is registered in the first embodiment.

(Case A; FIG. 8)

Case A will be described with reference to FIG. 8. In Case A, preset information is registered to the preset table 40 using communication according to IPP. In an initial state of Case A, the preset information PI1 (see FIG. 2) is stored in the preset table 40. Further, for each of the user names "U1", "U2", "U3", and "U4", the corresponding information (i.e., the user name, password, print condition information, registration permission flag, authority information, and registered preset name) are stored in the user table 38 (see FIG. 2). Further, the preset name "DPR" is associated with each user name as a registered preset name.

When accepting an operation for displaying the print setting screen in T10, the PC 100B sends a GPA to the printer 10 in T12.

When receiving the GPA from the PC100B in T12 (NO in S10, YES in S20 of FIG. 3, YES in S120 of FIG. 6), the printer 10 determines that a user name and a password are not included in the GPA (NO in S122), and sends an authentication information request to the PC 100B in T14 (S130).

When receiving the authentication information request from the printer 10 in T14, the PC 100B displays the authentication screen in T16. Then, when accepting an input of the user name U2 and a password P2 in T18, the PC 100B sends a GPA including the user name U2 and the password P2 to the printer 10 in T20.

When receiving the GPA from the PC 100B in T20 (NO in S10, YES in S20 of FIG. 3, YES in S120 of FIG. 6), the printer 10 determines that a user name and a password are included in the GPA (YES in S122), and then determines that the user authentication succeeded in T22 (YES in S124) because the combination of the user name U2 and the password P2 included in the GPA is registered in the user table 38. Then, the printer 10 identifies the preset name DPR associated with the user name U2 in the GPA from the user table 38 and identifies the preset information PI1 including the identified preset name DPR from the preset table 40. Then, in T24, the printer 10 sends to the PC 100B capability information including all the print conditions which the printer 10 can execute (i.e., "one-sided", "two-sided", "monochrome", and "color") and the identified preset information PI1.

Figure 12:
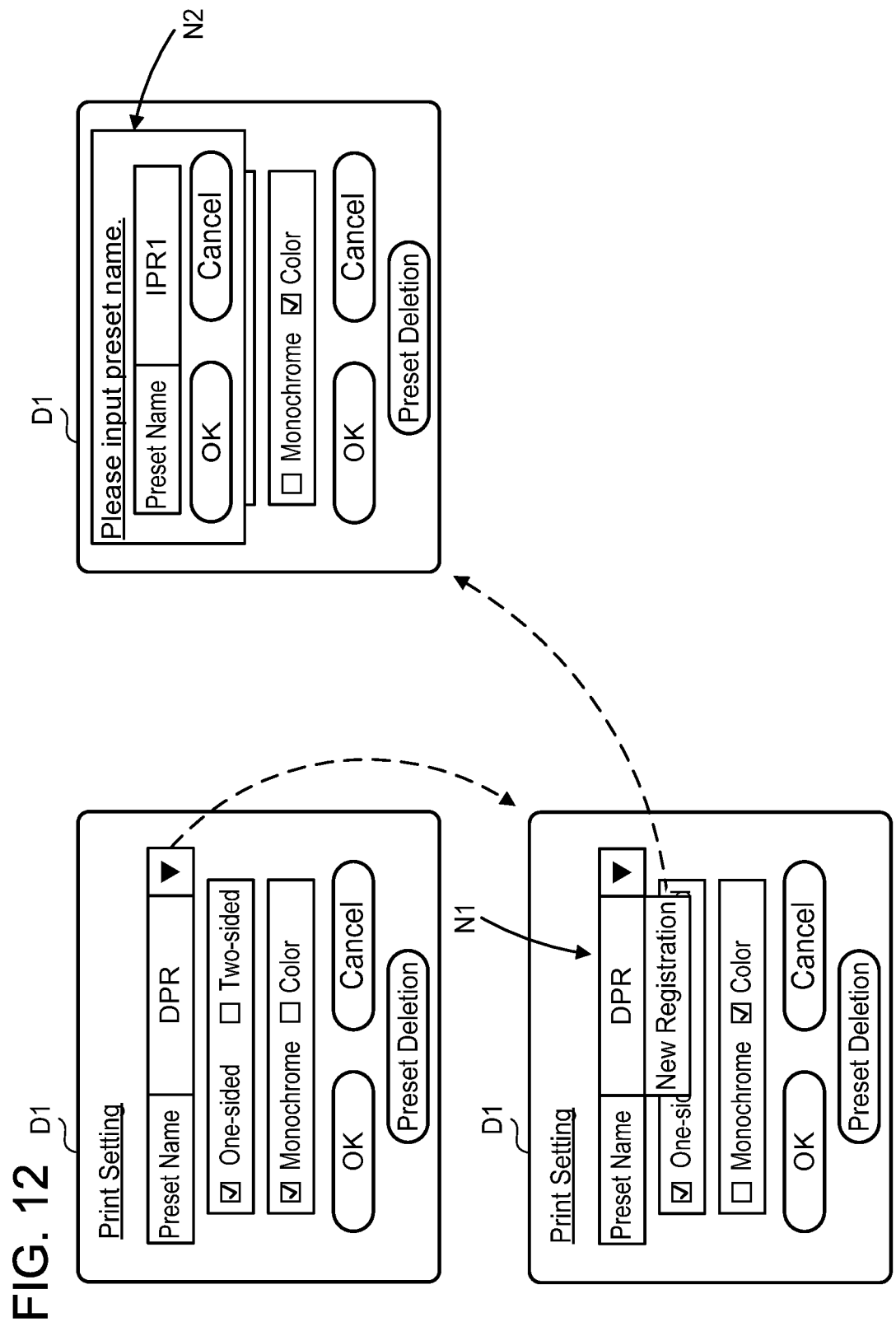
FIG. 12 shows examples of a screen displayed on a PC in the first and second embodiments.

When receiving the capability information from the printer 10 in T24, the PC 100B displays a print setting screen D1 in T30. As shown in FIG. 12, the print setting screen D1 includes a preset name selection box for selection of a preset name, four checkboxes corresponding to "one-sided", "two-sided", "monochrome", and "color", an OK button, a cancel button, and a preset deletion button. In initial print setting screen D1, the preset name "DPR" is displayed in the preset name selection box, and the checkboxes corresponding to "one-sided" and "monochrome" are checked. When accepting an operation of checking the checkbox corresponding to "color" in T32 and accepting a selection of the pull-down of the preset name selection box in T34, the PC 100B displays a preset name selection image N1 over the print setting screen D1 in T36. As shown in FIG. 12, the image N1 includes a list image of selectable preset names and a new registration image for registration of new preset information. When accepting a selection of the new registration image in T38, the PC 100B displays an input image N2 over the print setting screen D1 in T40. As shown in FIG. 12, the image N2 includes an input box for input of a preset name, an OK button, and a cancel button. When accepting an input of a preset name "IPR1" and a selection of the OK button in T42, the PC 100B sends a GPA including the user name U2 and the password P2 to the printer 10 in T50. T52 is the same as T24. In a variant, print setting information may be set after a registration-target preset name has been inputted. In this variant, the PC 100B accepts the selection of the pull-down of the preset name selection box without accepting the operation of checking the checkbox corresponding to "color" after having displayed the print setting screen D1. After this, processes same as T36 to T42 are executed. Then, when accepting the input of the preset name "IPR1" and the selection of the OK button in T42, the PC 100B displays the print setting screen in which the preset name "IPR1" is displayed in the preset name selection box. Then, when accepting the operation of checking the checkbox corresponding to "color" and the selection of the OK button, the PC 100B sends a GPA including the user name U2 and the password P2 to the printer 10.

When receiving the capability information from the printer 10 in T52, the PC 100B extracts the preset information PI1 in the capability information. Then, the PC 100B creates preset information PI2 in which the preset name IPR1 inputted in T42 is associated with the print setting information "one-sided" and "color" set in T32, and sends an SPA including the user name U2, the password P2, and the preset information PI1, PI2 to the printer 10 in T54.

When receiving the SPA from the PC 100B (NO in S10, YES in S20 of FIG. 3, NO in S120, YES in S150 of FIG. 6), the printer 10 determines that the registration-target preset information PI2 is included in the SPA (YES in S152). Then, the printer 10 determines that the registration permission flag associated with the user name U2 included in the SPA is "ON" in the user table 38 (YES in S180), determines that the print setting information in the preset information PI2 includes no restricted print condition associated with the user name U2 in the user table 38 (NO in S182), and registers the preset information PI2 to the preset table 40 in T56 (S184). Next, in T58, the printer 10 registers the preset name "IPR1" to the user table 38 as a registered preset name associated with the user name U2 (S186). Then, in T60, the printer 10 sends the registration completion information to the PC 100B (S188).

Figure 9:
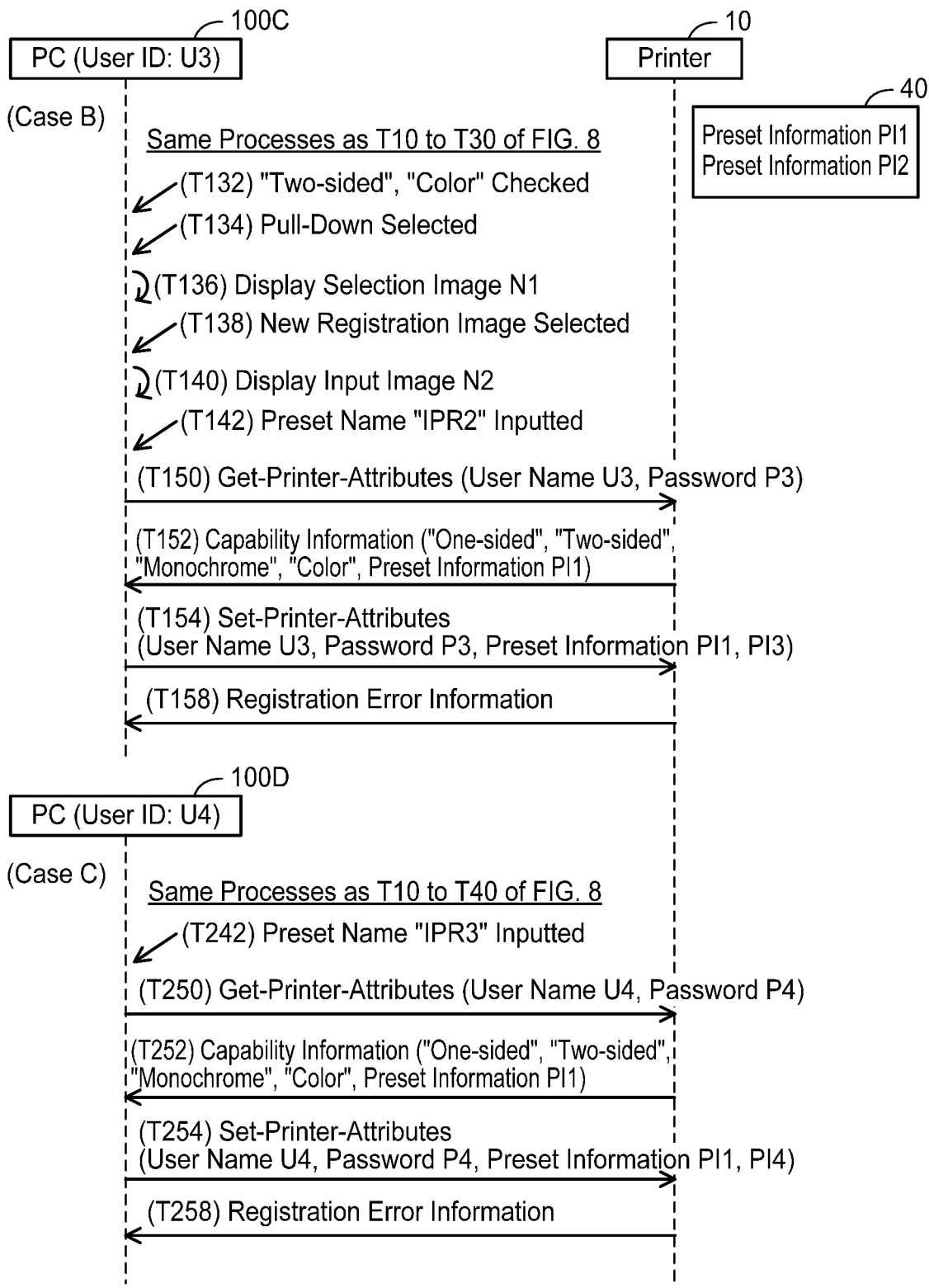
FIG. 9 shows a sequence diagram of Cases B and C in which registration of preset information is restricted in the first embodiment.

(Case B; FIG. 9)

Case B will be described with reference to FIG. 9. In Case B, the registration of preset information using communication according to IPP fails due to the print setting information in registration-target preset information includes a restricted print condition. An initial state of Case B is a state after Case A, that is, the preset information PI1 and PI2 are stored in the preset table 40.

Firstly, processes same as T10 to T30 of FIG. 8 are executed between the PC 100C and the printer 10. In the present case, the PC 100C accepts an input of the user name U3 and a password P3 in T18, and sends a GPA including the user name U3 and the password P3 to the printer 10 in T20.

In T132, the PC 100C accepts an operation of checking the checkboxes corresponding to "two-sided" and "color". T134 to T140 are the same as T34 to T40 of FIG. 8. When accepting an input of a preset name "IPR2" and a selection of the OK button in T142, the PC 100C sends a GPA including the user name U3 and the password P3 to the printer 10 in T150. T152 is the same as T52 of FIG. 8. When receiving the capability information from the printer 10 in T152, the PC 100C extracts the preset information PI1 in the capability information. Then, the PC 100C creates preset information PI3 in which the preset name IPR2 inputted in T142 is associated with the print setting information "two-sided" and "color" set in T132, and sends an SPA including the user name U3, the password P3, and the preset information PI1, PI3 to the printer 10 in T154.

When receiving the SPA from the PC 100C in T154 (NO in S10, YES in S20 of FIG. 3, NO in S120, YES in S150 of FIG. 6), the printer 10 determines that the registration-target preset information PI3 is included in the SPA (YES in S152). Then, the printer 10 determines that the registration permission flag associated with the user name U3 included in the SPA is "ON" in the user table 38 (YES in S180), and determines that the print setting information in the preset information PI3 includes a restricted print condition (i.e., "two-sided") associated with the user name U3 in the user table 38 (YES in S182). In this case, the printer 10 does not register the preset information PI3 to the preset table 40. Then, in T158, the printer 10 sends the registration error information to the PC 100C (S190). As a result, the user who uses the PC 100C can acknowledge that the registration of the preset information PI3 failed.

(Effects of Cases A and B)

As shown in Case A of FIG. 8, the printer 10 registers the preset information PI2 to the preset table 40 (T56) in the case of determining that the print setting information in the preset information PI2 includes no restricted print condition associated with the user name U2 in the user table 38. On the other hand, as shown in Case B of FIG. 9, the printer 10 does not register the preset information PI3 in the case of determining that the print setting information in the preset information PI3 includes a restricted print condition associated with the user name U3 in the user table 38. As such, it can be prevented that printing fails in response to preset information including a restricted print condition being used after the preset information including the restricted print condition has been registered to the preset table 40.

(Case C; FIG. 9)

Case C will be described with reference to FIG. 9. In Case C, the registration of preset information using communication according to IPP fails due to the registration permission flag in the user table 38 being "OFF". An initial state of Case C is the same as the initial state of Case B.

Firstly, processes same as T10 to T40 of FIG. 8 are executed between the PC 100D and the printer 10. In the present case, the PC 100D accepts an input of the user name U4 and a password P4 in T18, and sends a GPA including the user name U4 and the password P4 to the printer 10 in T20. When accepting an input of a preset name "IPR3" and a selection of the OK button in T242, the PC 100D sends a GPA including the user name U4 and the password P4 to the printer 10 in T250. T252 is the same as T52 of FIG. 8. When receiving the capability information from the printer 10 in T252, the PC 100D extracts the preset information PI1 in the capability information. Then, the PC 100D creates preset information PI4 in which the preset name IPR3 inputted in T242 is associated with the print setting information "one-sided" and "color" set in T32 of FIG. 8, and sends an SPA including the user name U4, the password P4, and the preset information PI1, PI4 to the printer 10 in T254.

When receiving the SPA from the PC 100D (NO in S10, YES in S20 of FIG. 3, NO in S120, YES in S150 of FIG. 6), the printer 10 determines that the registration-target preset information PI4 is included in the SPA (YES in S152). Then, the printer 10 determines that the registration permission flag associated with the user name U4 included in the SPA is "OFF" in the user table 38 (NO in S180). In this case, the printer 10 does not register the preset information PI4 to the preset table 40. Then, in T258, the printer 10 sends the registration error information to the PC 100D (S190). As a result, the user who uses the PC 100D can acknowledge that the registration of the preset information PI4 failed.

Figure 10:
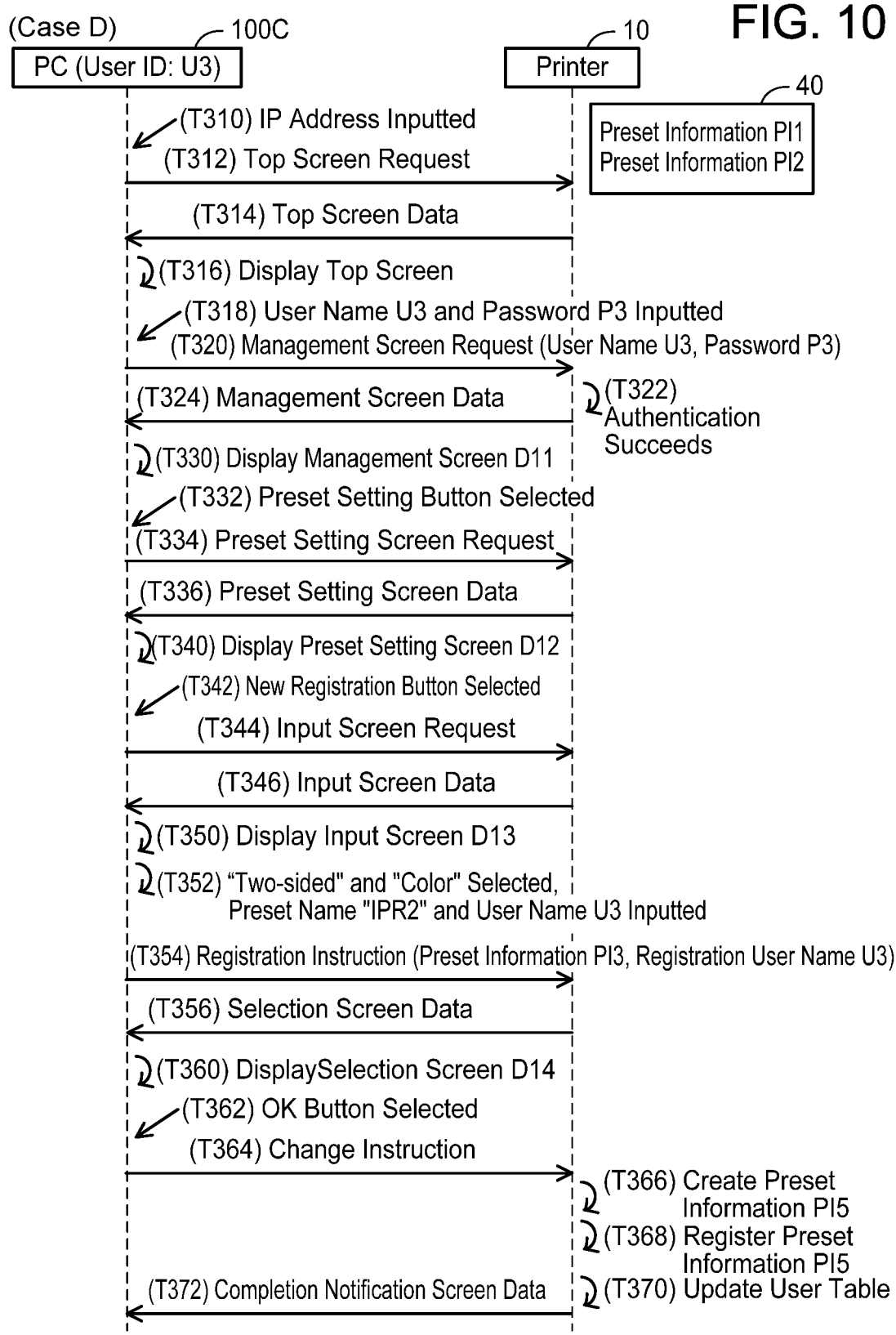
FIG. 10 shows a sequence diagram of Case D in which preset information is registered in the first embodiment.

(Case D; FIG. 10)

Case D will be described with reference to FIG. 10. In Case D, preset information is registered to the preset table 40 using the web server function of the printer 10. An initial state of Case D is the same as the initial state of Case B.

When accepting an input of an IP address assigned to the printer 10 in T310, the PC 100C sends a top screen request to the printer 10 in T312.

When receiving the top screen request from the PC 100C in T312 (YES in S10 of FIG. 3), the printer 10 sends the top screen data to the PC 100C in T314 (S40 of FIG. 4).

When receiving the top screen data from the printer 10 in T314, the PC 100C displays the top screen in T316. Then, when accepting an input of the user name U3 and the password P3 in T318, the PC 100C sends a management screen request including the user name U3 and the password P3 to the printer 10 in T320.

When receiving the management screen request from the PC 100C in T320 (S42), the printer 10 determines in T322 that the user authentication succeeded (YES in S44) because the combination of the user name U3 and the password P3 included in the management screen request is stored in the user table 38. Then, in T324, the printer 10 sends the management screen data to the PC 100C (S46).

When receiving the management screen data from the printer 10 in T324, the PC 100C displays the management screen D11 (see FIG. 13) in T330. Then, when accepting a selection of the preset setting button in T332, the PC 100C sends a preset setting screen request to the printer 10 in T334.

When receiving the preset setting screen request from the PC 100C in T334 (YES in S50), the printer 10 sends the preset setting screen data to the PC 100C in T336 (S52).

When receiving the preset setting screen data from the printer 10 in T336, the PC 100C displays the preset setting screen D12 (see FIG. 13) in T340. When accepting a selection of the new registration button in T342, the PC 100C sends an input screen request to the printer 10 in T344.

When receiving the input screen request from the PC 100C in T344 (YES in S60), the printer 10 sends the input screen data to the PC 100C in T346 (S62).

When receiving the input screen data from the printer 10 in T346, the PC 100C displays the input screen D13 (see FIG. 13) in T350. In T352, the PC 100C accepts an operation of checking the checkboxes corresponding to "two-sided" and "color", an input of the preset name "IPR2" to the preset name input box, and an input of the user name U3 to the registration user name input box. In this case, the PC 100C creates preset information PI3 in which the inputted preset name IPR2 is associated with the set print setting information "two-sided" and "color", and sends a registration instruction including the preset information PI3 and the registration user name U3 to the printer 10 in T354.

When receiving the registration instruction from the PC 100C in T354 (YES in S64), the printer 10 determines that the registration permission flag associated with the authenticated user name U3 is "ON" in the user table 38 (YES in S90 of FIG. 5) and determines that the preset information PI3 includes a restricted print condition (i.e., "two-sided") associated with the target-registration user name U3 (YES in S92). In this case, the printer 10 sends the selection screen data for displaying the selection screen to the PC 100C in T356 (S100).

When receiving the selection screen data from the printer 10 in T356, the PC 100C displays the selection screen D14 in T360. When accepting a selection of the OK button in T362, the PC 100C sends a change instruction to the printer 10 in T364.

When receiving the change instruction from the PC 100C in T364 (YES in S102), the printer 10 replaces the restricted print condition ("two-sided") included in the preset information PI3 received in T354 with the permitted print condition ("one-sided") to create new preset information PI5 in T366 (S104). In a variant, the printer 10 may create new preset information that does not include any print condition corresponding to the print setting item "print type" in the preset information PI3 and only includes the print condition "color" corresponding to the print setting item "number of colors" in the preset information PI3. That is, the printer 10 may create new preset information that does not include any print setting item corresponding to the restricted print condition included in the preset information PI3 and only includes a print setting item corresponding to the permitted print condition included in the preset information PI3. Next, the printer 10 registers the preset information PI5 to the preset table 40 in T368 (S106), and registers the preset name "IPR2" to the user table 38 as a registered preset name associated with the target-registration user name U3 in T370 (S108). Then, the printer 10 sends the completion notification screen data to the PC 100C in T372 (S98).

(Effects of Cases A to D)

As shown in Case A of FIG. 8, the printer 10 registers the preset information PI2 to the preset table 40 (T56) in the case of determining that the preset information PI2 includes no restricted print condition associated with the user name U2 in the user table 38. On the other hand, as shown in Case D of FIG. 10, the printer 10 sends the selection screen data to the PC 100C (T356) in the case of determining that the preset information PI3 includes the restricted print condition associated with the user name U3 in the user table 38. Then, when receiving the change instruction from the PC 100C (T364), the printer 10 registers the preset information PI5 to the preset table 40 (T368). As such, even in the case of receiving the preset information PI3 including the restricted print condition, the printer 10 can register preset information to the preset table 40 according to the selection result by the user.

Further, in Case D of FIG. 10, when receiving the change instruction from the PC 100C (T364), the printer 10 registers to the preset table 40 the preset information PI5 in which the restricted print condition ("two-sided") has been replaced with the permitted print condition ("one-sided") (T368). Therefore, the user who uses the PC 100C can execute printing by using the preset information PI5 thereafter.

Figure 11:
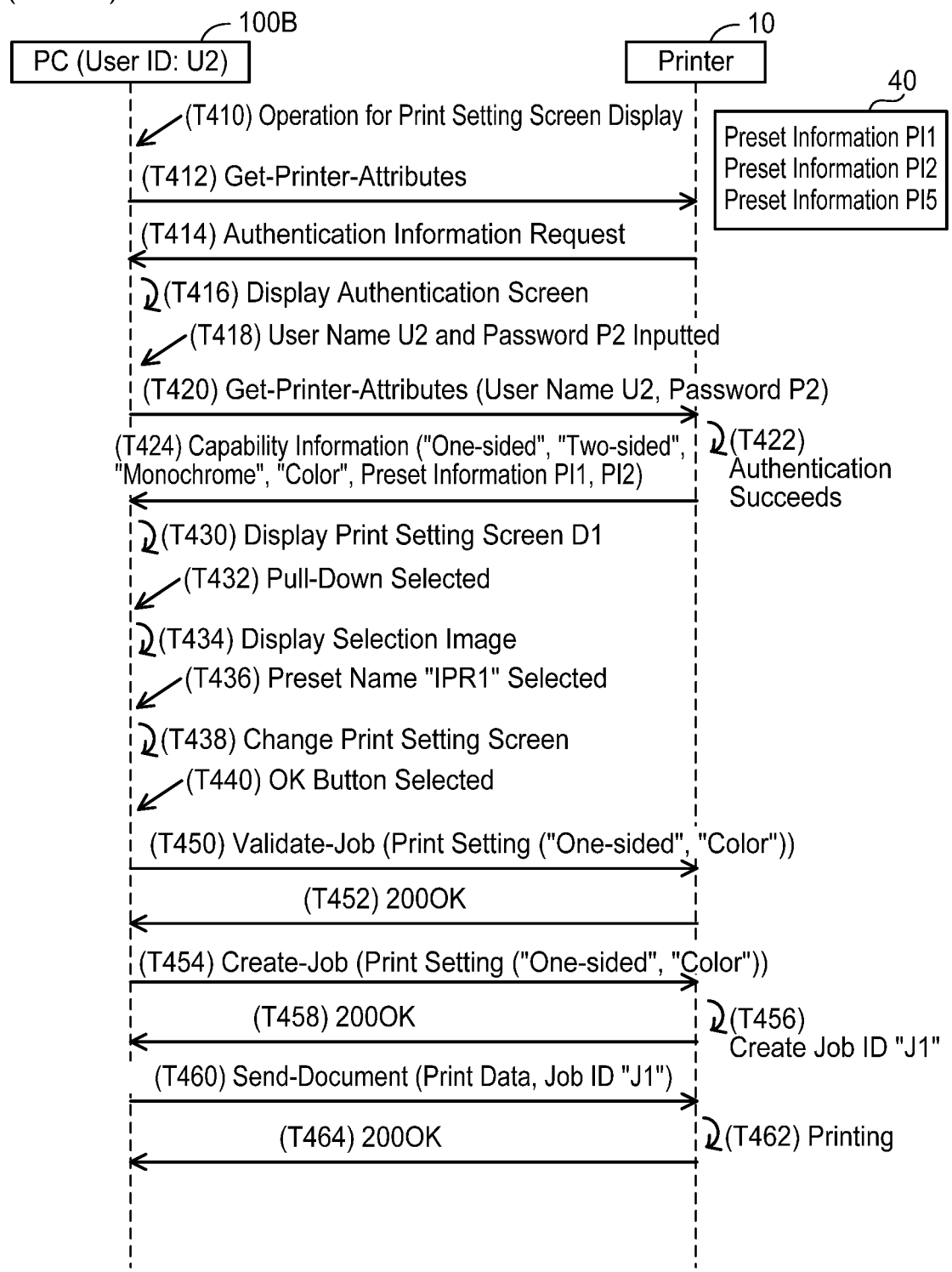
FIG. 11 shows a sequence diagram of Case E in which printing is executed in the first embodiment.

(Case E; FIG. 11)

Case E will be described with reference to FIG. 11. In Case E, a print process is executed using preset information in the preset table 40. An initial state of Case E is a state after Case D, that is, the preset information PI1, PI2, and PI5 are stored in the preset table 40. T410 to T422 are the same as T10 to T22 of FIG. 8. When the user authentication succeeded in T422 (YES in S124 of FIG. 6), the printer 10 identifies in the user table 38 the preset names "DPR" and "IPR1" associated with the user name for which the user authentication succeeded, and then identifies the preset information PI1 and PI2 including the identified preset names "DPR", "IPR1" in the preset table 40. Then, the printer 10 sends to the PC 100B capability information including all the print conditions which the printer 10 can execute ("one-sided", "two-sided", "monochrome", "color") and the identified preset information PI1, PI2 in T424.

T430 and T432 are the same as T30 and T34, respectively. In this case, the PC 100B displays a preset name selection image over the print setting screen D1. The preset name selection image of the present case includes the preset names "DPR" and "IPR1" and "new registration". When accepting a selection of the preset name "IPR1" in the preset name selection image in T436, the PC 100B identifies the preset information PI2 including the preset name "IPR1" in the capability information received in T424. Then, the PC 100B identifies the print conditions "one-sided" and "color" in the identified preset information PI2, and conforms the print setting on the print setting screen to the identified print conditions in T438. Specifically, the PC 100B unchecks the checkbox corresponding to "monochrome" and checks the checkbox corresponding to "color". As above, in response to the preset name being selected by the user, the printer 10 conforms the print setting on the print setting screen to the print setting information in the preset information including the preset name. When accepting a selection of the OK button in T440, the PC 100B sends a VJ according to IPP to the printer 10 in T450. The VJ includes the print setting (i.e., "one-sided", "color").

When receiving the VJ from the PC100B in T450, the printer 10 determines that the print setting (i.e., "one-sided", "color") included in the VJ can be executed, and sends a 200OK to the PC 100B in T452 (S160). The 200OK is not a command defined by IPP but is a command defined by HTTP, and it is specifically a command indicating that a process had been normally completed.

When receiving the 200OK from the printer 10 in T452, the PC 100B sends a Create-Job command (hereinbelow termed "CJ") according to IPP to the printer 10 in T454. The CJ includes the print setting (i.e., "one-sided", "color").

When receiving the CJ from the PC 100B in T454, the printer 10 creates a unique job ID "J1" in T456, and sends a 200OK including the created job ID "J1" to the PC 100B in T458 (S160).

When receiving the 200OK from the printer 10 in T458, the PC 100B sends a Send-Document command (hereinbelow termed "SD") according to IPP to the printer 10 in T460. The SD includes print data and the job ID "J1" included in the received 200OK.

When receiving the SD from the PC 100B in T460, the printer 10 identifies the print setting (i.e., "one-sided", "color") corresponding to the job ID "J1" included in the SD, and executes printing according to the print data in the SD and the identified print setting in T462 (S160). Then, the printer 10 sends a 200OK to the PC 100B in T464.

(Effects of Present Embodiment)

The printer 10 receives from one of the PCs the user name and a registration instruction or an SPA including registration-target preset information (S42, YES in S64 of FIG. 4, YES in S120, YES in S150 of FIG. 6). Then, in the case where the registration permission flag associated with the received user name is "ON" in the user table 38 in the memory 34 (YES in S90 of FIG. 5, YES in S180 of FIG. 7), the printer 10 registers the preset information to the preset table 40 in the memory 34 (S94 of FIG. 5, S184 of FIG. 7). On the other hand, in the case where the registration permission flag associated with the received user name is "OFF" in the user table 38 in the memory 34 (NO in S90 of FIG. 5, NO in S180 of FIG. 7), the printer 10 does not register the preset information to the preset table 40 in the memory 34. Thus, the printer 10 can suitably restrict the registration of the preset information to the preset table 40 in the memory 34 in accordance with the registration permission flag associated with a user name in the user table 38 in the memory 34. In other words, by setting the registration permission flags in the user table 38 of the printer 10, the administrator of the printer 10 can set whether or not the users who use the user names in the user table 38 are permitted to register preset information to the preset table 40.

(Corresponding Relationships)

The PCs 100A to 100D are examples of "external device". The user name and the registration permission flag are respectively examples of "user identification information" and "registration related information". The registration instruction and the SPA including registration-target preset information are examples of "registration request". "ON" and "OFF" of the registration permission flag are respectively examples of "permission information" and "restriction information". The GPA is an example of "capability information request". The top screen data request is an example of "access request". The user name and the password described in a header of the capability information request are examples of "user identification information". T42 of FIG. 8 is an example of "first predetermined operation". The top screen and the top screen data are respectively examples of "acceptance screen" and "acceptance screen data". T352 of FIG. 10 is an example of "second predetermined operation". The print setting items "print type" and "number of colors" are examples of "specific setting item". The print setting information in each of the preset information PI2, PI3, and PI4 is an example of "first print setting information". The print setting information in the preset information PI5 is an example of "second print setting information".

S42 of FIG. 4 and S120 and S150 of FIG. 6 are examples of "receive first user identification information". S64 of FIG. 4 and S150 of FIG. 6 are examples of "receive a registration request". S94 of FIG. 5 and S184 of FIG. 7 are examples of "register the first print setting information".

Second Embodiment

In the present embodiment, a first registration process (FIG. 5) and a second registration process (FIG. 7) executed by the printer 10 differ from those of the first embodiment. In the first registration process of FIG. 5, the CPU 32 of the printer 10 skips S92 and proceeds to S94 in the case of determining YES in S90. Further, in the second registration process of FIG. 7, the CPU 32 skips S182 and proceeds to S184 in the case of determining YES in S180.

Figure 14:
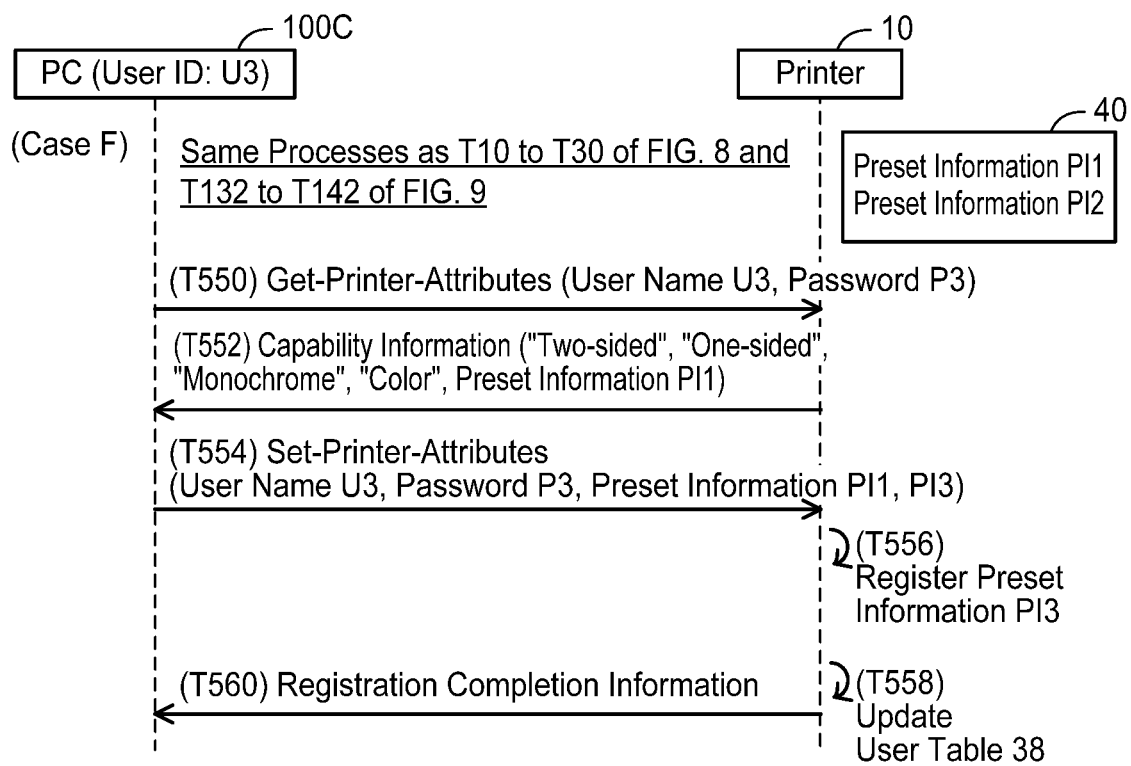
FIG. 14 shows a sequence diagram of Case F in which preset information is registered in the second embodiment.
Figure 15:
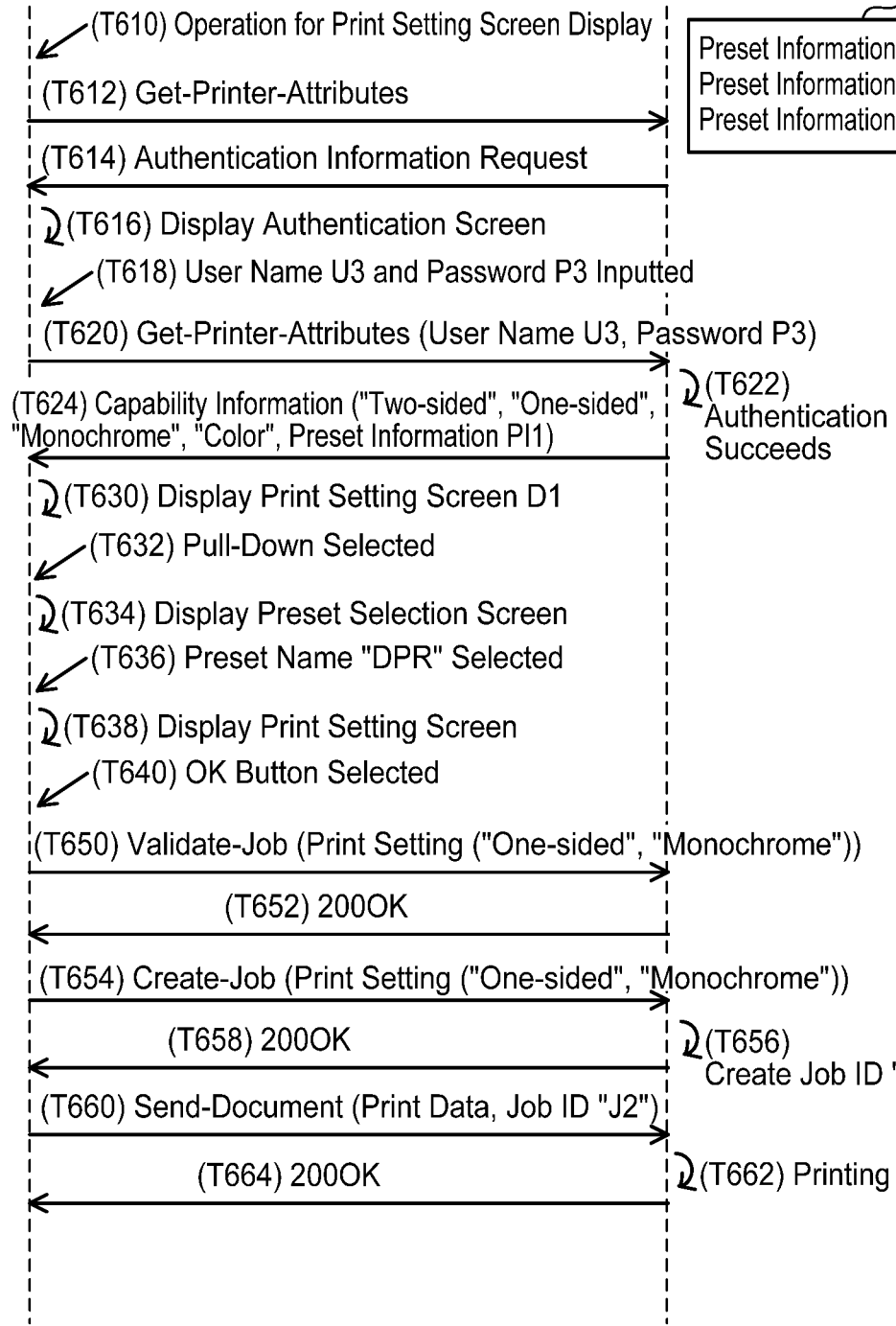
FIG. 15 shows a sequence diagram of Case G in which printing is executed in the second embodiment.

(Specific Cases F and G; FIGS. 14 and 15)

Specific Cases F and G realized by the processes of FIGS. 3 to 7 of the present embodiment will be described with reference to FIGS. 14 and 15.

(Case F; FIG. 14)

Case F will be described with reference to FIG. 14. In Case F, preset information is registered to the preset table 40 using communication according to IPP. An initial state of Case F is the same as the initial state of Case B.

Firstly, processes same as T10 to T30 of FIG. 8 and T132 to T142 of FIG. 9 are executed between the PC 100C and the printer 10. In the present case, the PC 100C accepts an input of the user name U3 and the password P3 in T18, and sends a GPA including the user name U3 and the password P3 to the printer 10 in T20.

T550 to T554 are the same as T150 to T154 of FIG. 9. When receiving the SPA from the PC 100C in T554 (NO in S10, YES in S20 of FIG. 3, NO in S120, YES in S150 of FIG. 6), the printer 10 determines that the registration-target preset information PI3 is included in the SPA (YES in S152). Then, the printer 10 determines that the registration permission flag associated with the user name U3 included in the SPA is "ON" in the user table 38 (YES in S180), registers the preset information PI3 to the preset table 40 in T556 (S184), and registers the preset name "IPR2" to the user table 38 as a registered preset name associated with the user name U3 included in the SPA in T558 (S186). Then, in T560, the printer 10 sends the registration completion information to the PC 100C (S188).

(Case G; FIG. 15)

Case G will be described with reference to FIG. 15. In Case G, a print process is executed using preset information in the preset table 40.

T610 to T622 are the same as T410 to T422 of FIG. 11. In the present case, the PC 100C accepts an input of the user name U3 and the password P3 in T618, and sends a GPA including the user name U3 and the password P3 to the printer 10 in T620.

When the user authentication succeeded in T622 (YES in S124 of FIG. 6), the printer 10 identifies the preset names "DPR" and "IPR2" associated with the authenticated user name U3 in the user table 38, and identifies the preset information PH and PI3 including the identified preset names "DPR" and "IPR2" in the preset table 40. Then, the printer 10 determines whether or not each of the print setting information in the identified preset information PI1 and PI3 includes a restricted print condition associated with the authenticated user name U3 in user table 38. Then, the printer 10 determines that the print setting information in the preset information PI3 includes the restricted print condition "two-sided" associated with the authenticated user name U3 in the user table 38. In this case, the printer 10 determines that the preset information PI3 is preset information that is not to be sent. Then, in T624, the printer 10 sends to the PC 100C capability information including all the print conditions which the printer 10 can execute ("one-sided", "two-sided", "monochrome", "color") and the identified preset information PI1. If the printer 10 receives a GPA including the user name U3 from the PC 100C after the print condition "two-sided" associated with the user name U3 in the user table 38 has been changed from "OFF" to "ON" by the administrator, the printer 10 sends the preset information PI3 to the PC 100C. In a variant, the printer 10 may create preset information by replacing the restricted print condition ("two-sided") included in the preset information PI3 with the permitted print condition ("one-sided") and send capability information including the created preset information to the PC 100C.

T630 to T640 are the same as T430 to T440 of FIG. 9 except that the preset name DPR is selected. Further, T650 to T664 are the same as T450 to T 464 except that the print conditions are "one-sided" and "monochrome" and the job ID is "J2".

(Effects of Cases F and G)

As shown in Case F of FIG. 14, the printer 10 registers the preset information PI3 to the preset table 40 (T556) regardless of whether or not the preset information PI3 sent from the PC 100C includes a restricted print condition. Further, as shown in Case G of FIG. 15, when receiving the GPA from the PC 100C (T620), the printer 10 does not send the preset information PI3 including the restricted print condition to the PC 100C (T624). As such, it can be prevented that printing fails in response to the user who uses the PC 100C selecting the preset information PI3 including the restricted print condition and the VJ including the restricted print condition being sent.

Third Embodiment

In the present embodiment, a web server process (FIG. 16), a first registration process (FIG. 17), an IPP process (FIG. 18), and a second registration process (FIG. 19) executed by the printer 10 differ from those of the first embodiment. Hereinbelow, processes that are the same as those of the first embodiment will be given the same step numbers and descriptions thereof will be omitted.

Figure 16:
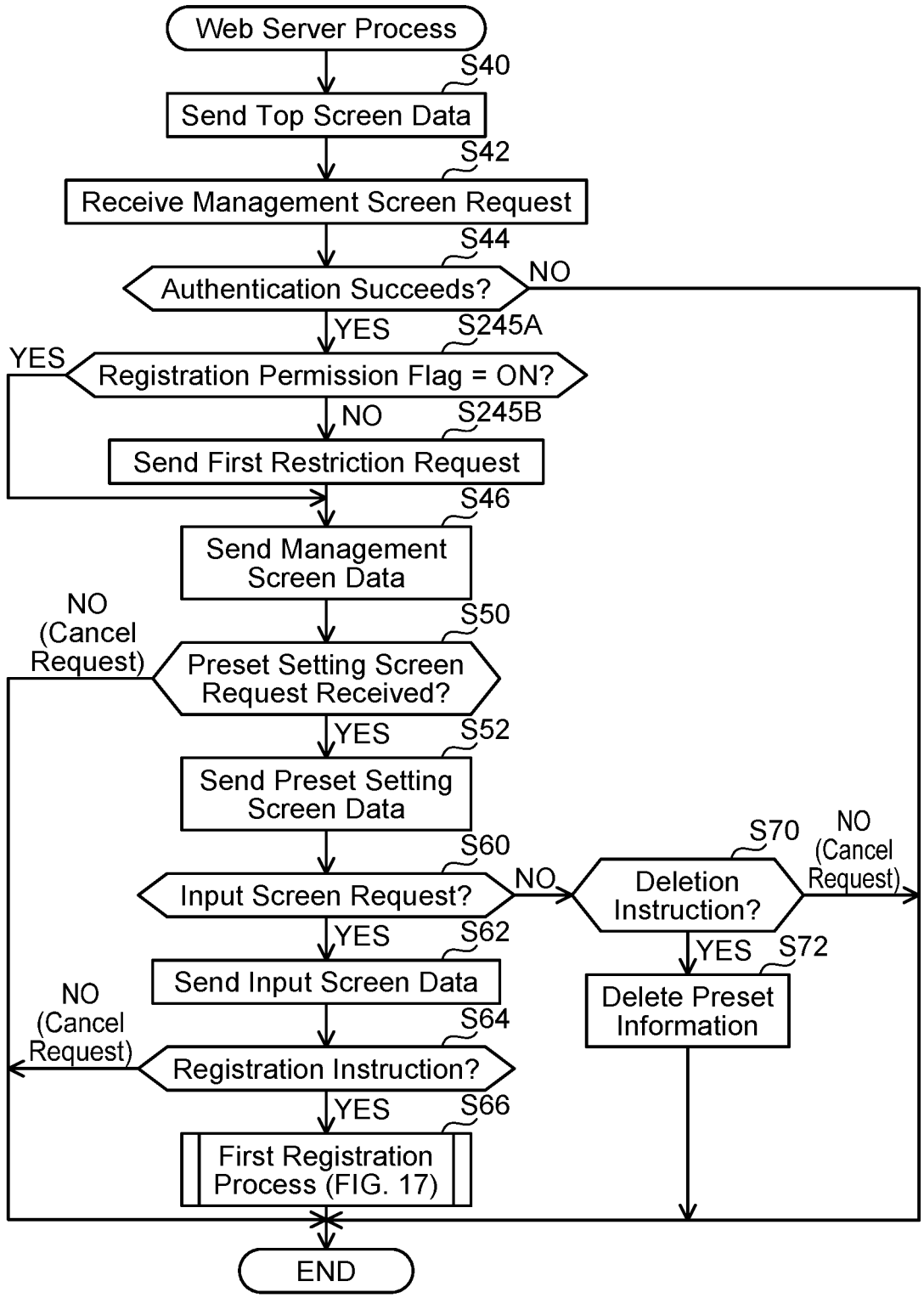
FIG. 16 shows a flowchart of a web server process according to the third embodiment.

(Web Server Process; FIG. 16)

The CPU 32 proceeds to S245A in the case of determining YES in S44. S245A is the same as S90 of FIG. 5. The CPU 32 proceeds to S245B in a case of determining NO in S245A. On the other hand, the CPU 32 skips S245B and proceeds to S46 in a case of determining YES in S245A.

In S245B, the CPU 32 sends a first restriction request to the PC. The first restriction request is information for requesting restriction on sending of a registration instruction. When S245B is completed, the CPU 32 proceeds to S46. Here, the timing at which the first restriction request is sent is not limited to after S245A. The CPU 32 may send the first restriction request to the PC before or simultaneously with sending the preset setting screen data to the PC.

Figure 17:
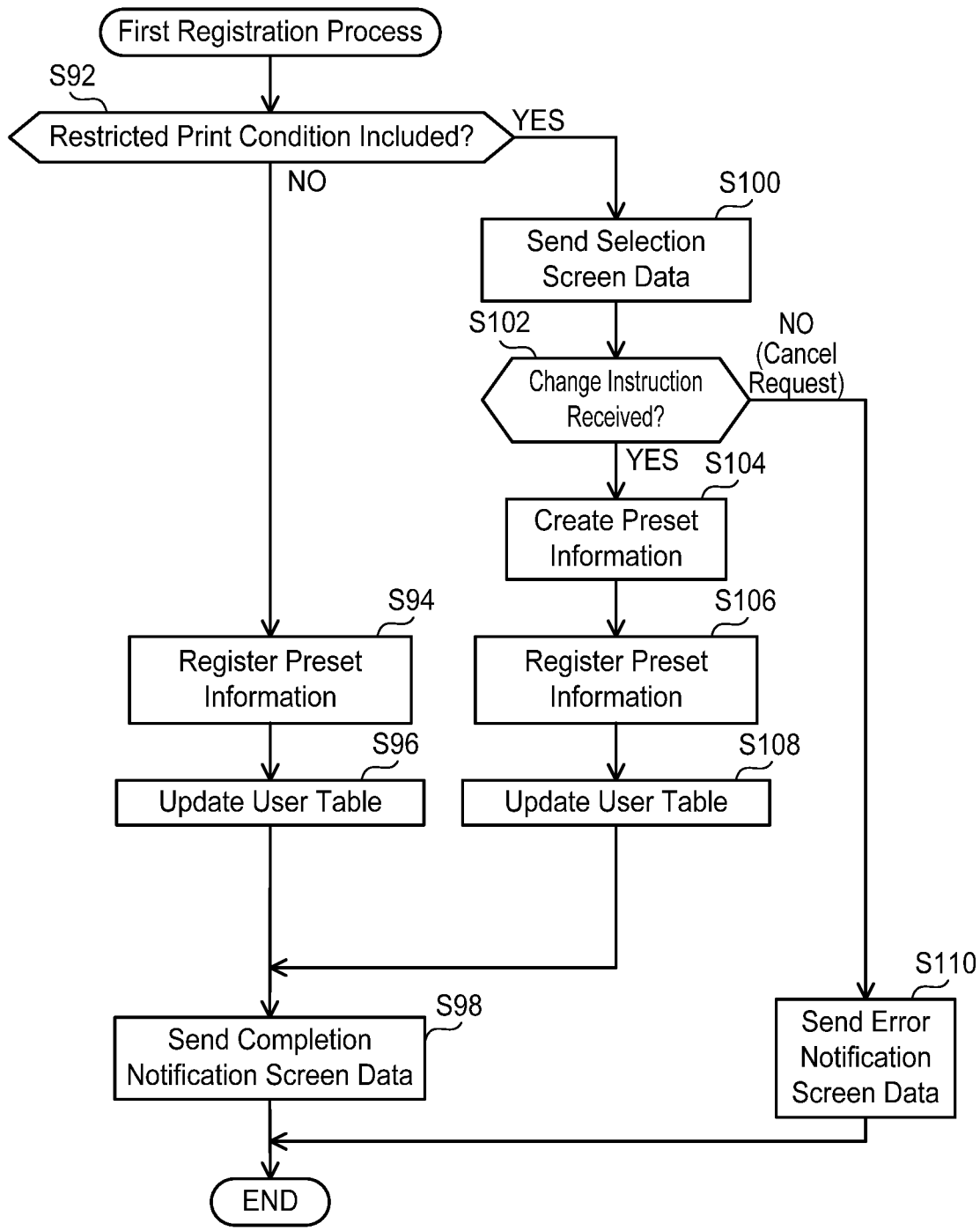
FIG. 17 shows a flowchart of a first registration process according to the third embodiment.

(First Registration Process; FIG. 17)

The first registration process of the present embodiment does not include S90 of FIG. 5. Except for that, the first registration process of the present embodiment is the same as the first registration process of the first embodiment (FIG. 5).

Figure 18:
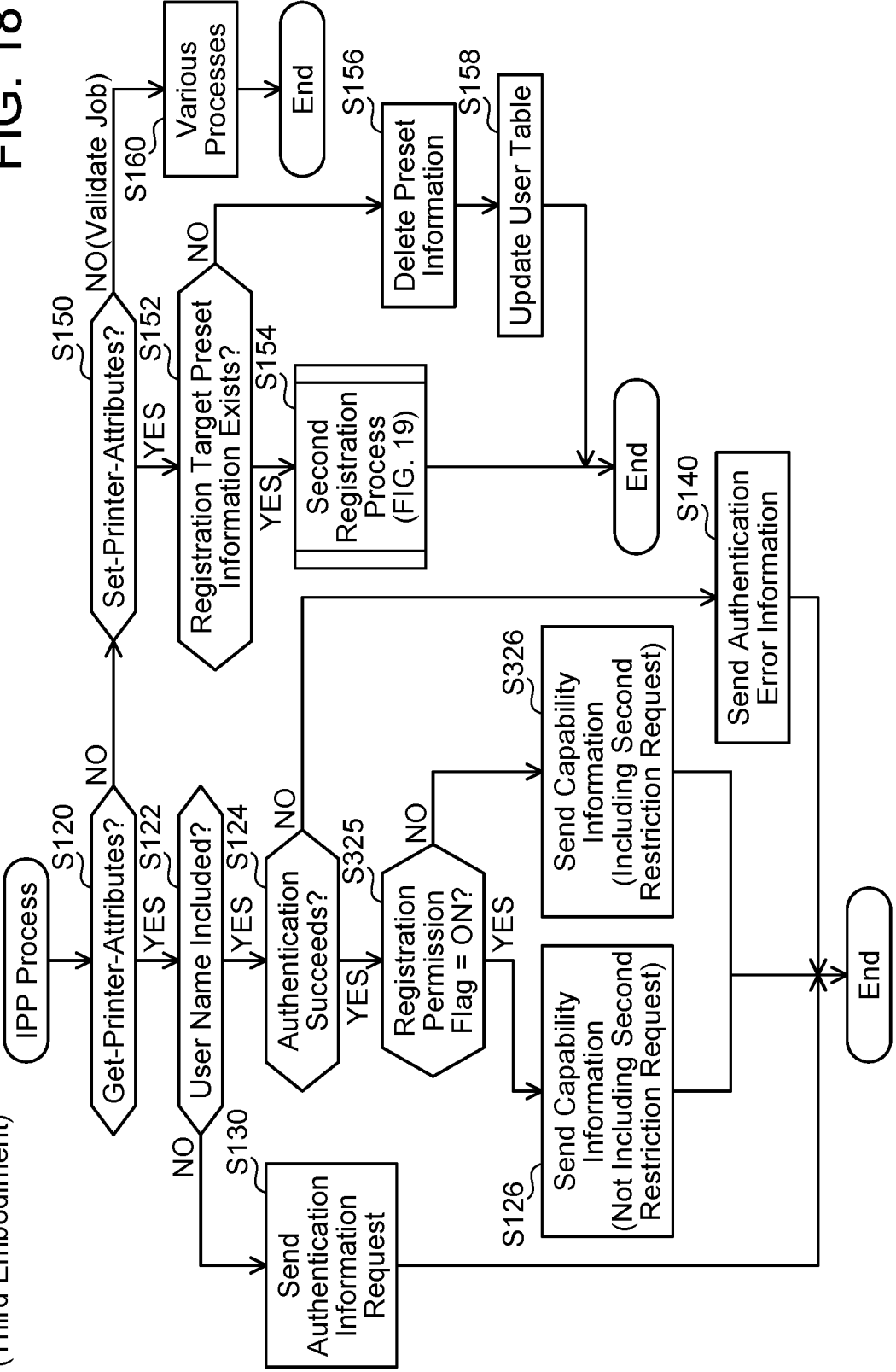
FIG. 18 shows a flowchart of an IPP process according to the third embodiment.

(IPP Process; FIG. 18)

The CPU 32 proceeds to S325 in the case of determining YES in S124. S325 is the same as S180 of FIG. 7. The CPU 32 proceeds to S126 in a case of determining YES in S325. On the other hand, the CPU 32 proceeds to S326 in a case of determining NO in S325.

In S326, the CPU 32 sends capability information to the PC. This capability information includes a second restriction request. Except for that, the capability information is the same as the capability information sent to the PC in S126. The second restriction request is information for requesting restriction on sending of an SAP including registration-target preset information. In a variant, the CPU 32 may send the second restriction request to the PC separately from the capability information.

Figure 19:
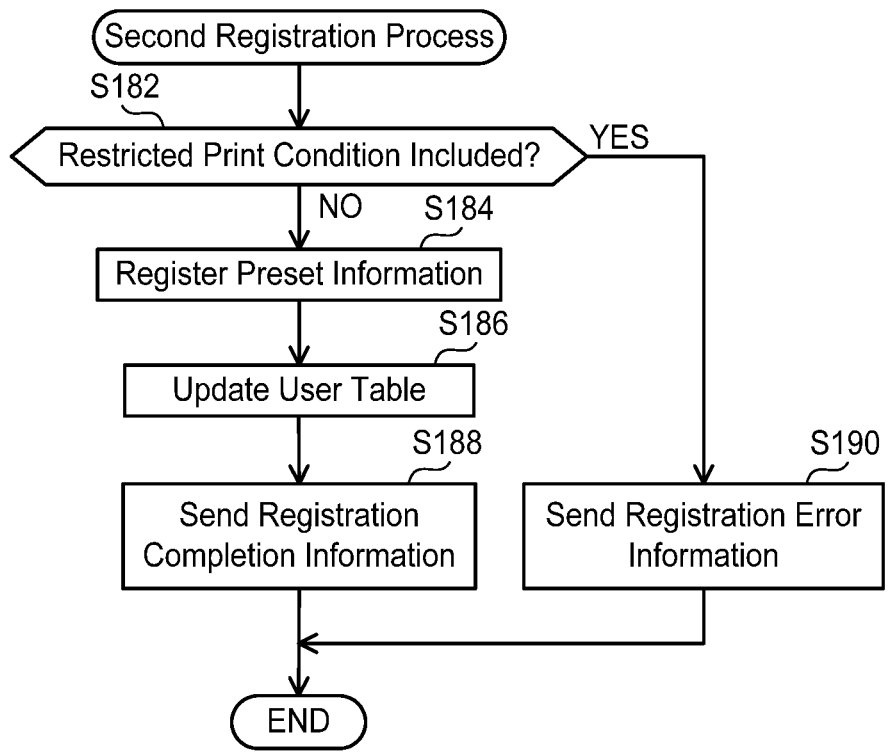
FIG. 19 shows a flowchart of a second registration process according to the third embodiment.

(Second Registration Process; FIG. 19)

The second registration process of the present embodiment does not include S180 of FIG. 7. Except for that, the second registration process of the present embodiment is the same as the second registration process of the first embodiment (FIG. 7).

Figure 20:
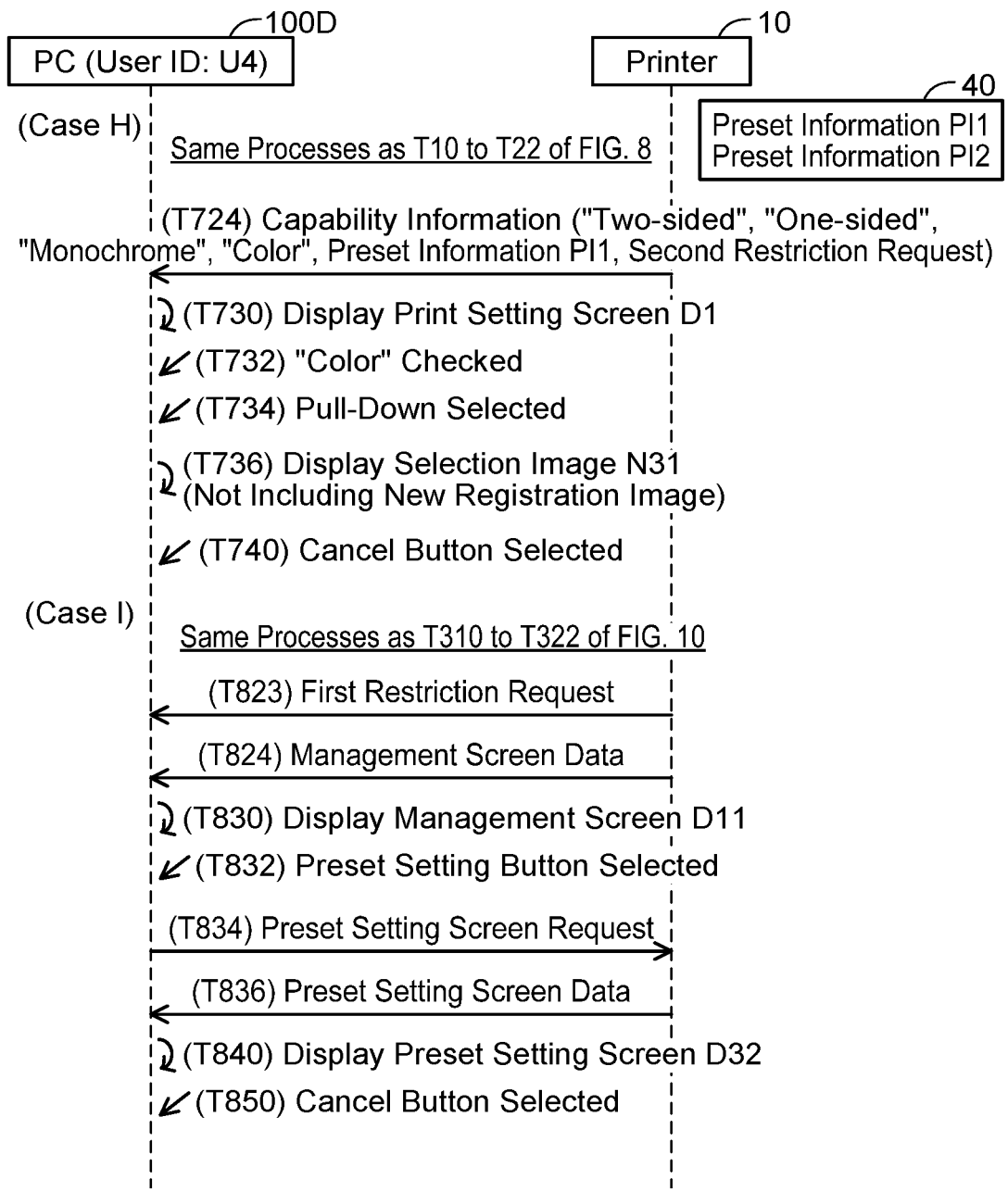
FIG. 20 shows a sequence diagram of Cases H and I in which registration of preset information is restricted in the third embodiment.

(Specific Cases H and I; FIG. 20)

Specific Cases H and I realized by the processes of FIGS. 16 to 19 of the present embodiment will be described with reference to FIGS. 20 to 22.

(Case H; FIG. 20)

Case H will be described with reference to FIG. 20. In Case H, the registration of preset information using communication according to IPP is restricted due to the registration permission flag in the user table 38 being "OFF". An initial state of Case H is the same as the initial state of Case B shown in FIG. 9.

Firstly, processes same as T10 to T22 of FIG. 8 are executed between the PC 100D and the printer 10. In the present case, the PC 100D accepts an input of the user name U4 and the password P4 in T18, and sends a GPA including the user name U4 and the password P4 to the printer 10 in T20.

The printer 10 determines in T22 that the user authentication succeeded (YES in S124 of FIG. 18), and determines that the registration permission flag associated with the user name U4 included in the GPA is "OFF" in the user table 38 (NO in S325). In this case, in T724, the printer 10 sends to the PC 100D capability information including all the print conditions which the printer 10 can execute (i.e., "one-sided", "two-sided", "monochrome", "color"), the preset information PI1, and the second restriction request.

When receiving the capability information from the printer 10 in T724, the PC 100D displays the print setting screen D1 (see FIG. 12) in T730. T732 and T734 are the same as T32 and T34 of FIG. 8, respectively. When accepting a selection of the pull-down, the PC 100D determines that the capability information received in T724 includes the second restriction request, and displays a preset selection image N31 over the print setting screen D1 in T736. As shown in FIG. 21, the image N31 includes a list image of selectable preset names, but does not include a new registration image for registration of new preset information (see FIG. 12). In a variant, the image N31 may include a disabled new registration image. As a result, the user who uses the PC 100D can acknowledge that the registration of preset information is restricted. In T740, the PC 100D accepts a selection of the cancel button.

(Case I; FIG. 20)

Next, Case I will be described with reference to FIG. 20. In Case I, the registration of preset information using the web server function of the printer 10 is restricted due to the registration permission flag in the user table 38 being "OFF". An initial state of the Case I is the same as the initial state of Case H.

Firstly, processes same as T310 to T322 of FIG. 10 are executed between the PC 100D and the printer 10. In the present case, the PC 100D accepts an input of the user name U4 and the password P4 in T318, and sends a management screen request including the user name U4 and the password P4 to the printer 10 in T320.

The printer 10 determines in T322 that the user authentication succeeded (YES in S44 of FIG. 16), determines that the registration permission flag associated with the authenticated user name U4 is "OFF" in the user table 38 (NO in S245A), and sends the first restriction request to the PC 100D in T823. T824 to T836 are the same as T324 to T336 of FIG. 10. The PC 100D determines that the first restriction request has been received, and displays a preset setting screen D32 in T840. As shown in FIG. 22, the screen D32 does not include a new registration button. Except for that, the screen D32 is the same as the preset setting screen D12 of the first embodiment (see FIG. 13). In a variant, the screen D32 may include a disabled new registration button. As a result, the user who uses the PC 100D can acknowledge that the registration of preset information is restricted. In T850, the PC 100D accepts a selection of the cancel button.

Effects of Present Embodiment

The printer 10 receives the user name from the PC (S42 of FIG. 16, YES in S120 and YES in S122 of FIG. 18). Then, the printer 10 receives a registration instruction or an SAP including registration-target preset information from the PC in a state where the registration permission flag associated with the received user name is "ON" in the user table 38 in the memory 34 (YES in S64 of FIG. 16, YES in S150 and S152 of FIG. 18). In this case, the printer 10 registers the preset information to the preset table 40 in the memory 34 (S94 of FIG. 17, S184 of FIG. 19). On the other hand, in the case where the registration permission flag associated with the received user name is "OFF" in the user table 38 in the memory 34 (NO in S245A of FIG. 16, NO in S325 of FIG. 18), the printer 10 sends the first restriction request or the second restriction request to the PC (S245B of FIG. 16, S326 of FIG. 18). In this case, the printer 10 does not receive a registration instruction nor an SAP including registration-target preset information from the PC. Therefore, the printer 10 does not register preset information to the preset table 40 in the memory 34. Thus, the printer 10 can suitably restrict the registration of preset information to the preset table 40 in the memory in accordance with the registration permission flag associated with a user name in the user table 38 in the memory 34. In other words, by setting the registration permission flags in the user table 38 of the printer 10, the administrator of the printer 10 can set whether or not the users who use the user names in the user table 38 are permitted to register preset information to the preset table 40.

(Corresponding Relationships)

The first restriction request and the second restriction request are examples of "restriction request". The registration instruction and the SAP including registration-target preset information is an example of "registration request". S42 of FIG. 16 and S120 of FIG. 18 are examples of "receive first user identification information". S245B of FIG. 16 and S326 of FIG. 18 are examples of "send a restriction request". S64 of FIG. 16 and S150 of FIG. 18 are examples of "receive the registration request". S94 of FIG. 17 and S184 of FIG. 19 are examples of "register the first print setting information".

(First Variant) In a case of receiving a command including only registration-target preset information (i.e., a registration command) instead of the SPA, the printer 10 may register the preset information included in the command to the preset table 40. Further, the SPA may include only registration-target preset information.

(Second Variant) After T42 of FIG. 8, the PC 100B may extract the preset information PI1 in the capability information received in T24 and send an SPA including the user name U2, the password P2, and the preset information PI1, PI2 to the printer 10 in T54. In this variant, T50 and T52 may be omitted. T150, T152, T250, and T252 of FIG. 9 and T550 and T552 of FIG. 14 may also be omitted.

(Third Variant) The second registration process of FIG. 7 may be omitted. In this variant, "receive first capability information request" and "send the capability information" may be omitted.

(Fourth Variant) The first registration process of FIG. 5 may be omitted. In this variant, "receive an access request" and "send acceptance screen data" may be omitted.

(Fifth Variant) The message displayed on the selection screen may be a message for checking whether preset information including a restricted print condition is to be registered. In this variant, the printer 10 monitors receipt of a registration instruction in S102 and proceeds to S94 in a case of determining YES in S102. In this variant, S104 to S108 may be omitted.

(Sixth Variant) The PCs 100A to 100D may each send the management screen request in the case of accepting an input of the IP address assigned to the printer 10. In this variant, the printer 10 sends the authentication screen data to the PC in a case of receiving the preset setting screen request or the input screen request. In another variant, the management screen or the preset setting screen may include an image for input of a user name and a password. In yet another variant, a screen for input of a user name and a password may be displayed in the case where the new registration button is selected.

(Seventh Variant) In S104 of FIG. 5, the CPU 32 of the printer 10 may change the restricted print condition included in the print setting information in the target preset information to the permitted print condition in the user table 38. That is, in a case where the print setting information in the target preset information includes a restricted print condition associated with the authenticated user name in the user table 38, this restricted print condition may be changed. In other words, in the case where the print setting information in the target preset information includes a restricted print condition associated with the authenticated user name in the user table 38, the restricted print condition in the user table 38 may be changed from "OFF" to "ON" such that the print setting information in the target preset information may be changed to include the permitted print condition associated with the authenticated user name in the user table 38. In this variant, When S104 is completed, the CPU 32 proceeds to S94.

(Eighth Variant) In the second embodiment, the printer 10 may send capability information including all the print conditions which the printer 10 can execute ("one-sided", "two-sided", "monochrome", "color") and the preset information PI1, PI3 to the PC 100C in T624 of FIG. 15. In this variant, the printer 10 sends the preset information to the PC regardless of whether or not the preset information includes a restricted print condition.

(Ninth Variant) In the above embodiments, the respective processes executed by the controller 30 are realized by software (i.e., the program 36), however, at least one of these processes may be realized by hardware such as a logic circuit.

What is claimed is:

1. A printer comprising:
  a memory configured to store, for each of one or more user identification information, the user identification information, registration related information which is related to registration of print setting information and authority information in association with each other, the registration related information being either of permission information indicating that registration of the print setting information is permitted or restriction information indicating that registration of the print setting information is restricted, the authority information being either of administrator information indicating that a user is an administrator of the printer or general information indicating that the user is a general user other than the administrator of the printer;
  a communication interface; and
  a controller configured to:
    receive first user identification information from an external device via the communication interface;
    receive a registration request including first print setting information from the external device via the communication interface, the registration request being for requesting registration of print setting information to the memory; and
    in a first case where the first user identification information and the registration request are received from the external device, the registration related information associated with the first user identification information among the one or more user identification information in the memory is the permission information and the authority information associated with the first user identification information in the memory is the general information, register the first print setting information included in the registration request in the memory in association with the first user identification information,
  wherein in a second case where the first user identification information and the registration request are received from the external device, the registration related information associated with the first user identification information in the memory is the restriction information and the authority information associated with the first user identification information in the memory is the general information, the first print setting information is not registered in the memory,
  wherein the memory is further configured to store a permission print condition corresponding to a specific setting item in association with the first user identification information, and
  the permission print condition is a print condition that a user, identified by the first user identification information, is permitted to use,
  wherein in the first case where a specific printing condition that is included in the first print setting information and corresponds to the specific setting item is included in the permission print condition associated with the first user identification information, the first print setting information is registered in the memory in association with the first user identification information,
  wherein in the first case where the specific print condition is not included in the permission print condition, the first print setting information is not registered in the memory.

2. The printer as in claim 1, wherein the controller is further configured to:
  receive first capability information request from the external device via the communication interface, the first capability information request being for requesting sending of capability information indicating a capability of the printer; and
  in a case where the first capability information request is received from the external device, send the capability information to the external device via the communication interface,
  wherein in a case where a first predetermined operation is performed on the external device after the capability information has been sent to the external device, the registration request including the first user identification information is received from the external device.

3. The printer as in claim 1, wherein the controller is further configured to:
  receive an access request for requesting an access to a web server in the printer from the external device via the communication interface; and
  in a case where the access request is received from the external device, send acceptance screen data to the external device via the communication interface, the acceptance screen data representing an acceptance screen for accepting an input of user identification information,
  wherein in a case where the first user identification information is inputted to the acceptance screen after the acceptance screen data has been sent to the external device, the first user identification information is received from the external device; and in a case where the first user identification information is received from the external device and a second predetermined operation is performed on the external device, the registration request is received from the external device.

4. The printer as in claim 1, wherein the controller is further configured to:
in the first case where the specific print condition is not included in the permission print condition, send selection screen data to the external device via the communication interface, the selection screen data representing a selection screen for selecting whether registration is required; and
after the selection screen data has been sent to the external device, receive selection result information indicating a selection result on the selection screen from the external device via the communication interface,
wherein in a case where the selection result indicated by the selection result information indicates that registration is required, second print setting information obtained by using the first print setting information is registered in the memory in association with the first user identification information,
wherein in a case where the selection result indicates that registration is not required, the second print setting information is not registered in the memory.

5. The printer as in claim 4, wherein in the case where the selection result indicates that registration is required, the second print setting information obtained by replacing the specific print condition included in the first print setting information with the permission print condition is registered in the memory.

6. The printer as in claim 1, wherein
the first print setting information is information sent to the external device for the printer to execute printing according to an Internet Printing Protocol (IPP).

7. The printer as in claim 1, wherein the controller is further configured to:
in a case where the first user identification information and the registration request are received from the external device, the registration related information associated with the first user identification information is the permission information and the authority information associated with the first user identification information in the memory is the administrator information, register the first print setting information included in the registration request in the memory in association with the first user identification information,
wherein in a case where the first user identification information and the registration request are received from the external device, the registration related information associated with the first user identification information in the memory is the restriction information and the authority information associated with the first user identification information in the memory is the administrator information, the first print setting information is not registered in the memory.

8. A printer comprising:
a memory configured to store, for each of one or more user identification information, the user identification information and registration related information which is related to registration of print setting information in association with each other, the registration related information being either of permission information indicating that registration of the print setting information is permitted or restriction information indicating that registration of the print setting information is restricted;
a communication interface; and
a controller configured to:
receive first user identification information from an external device via the communication interface;
in a case where the first user identification information is received from the external device in a state where registration related information associated with the first user identification information is the restriction information, send a restriction request to the external device via the communication interface, the first user identification information being included in the one or more user identification information in the memory, and the restriction request being for requesting restriction on sending of a registration request for requesting registration of the print setting information to the memory, wherein in a case where the first user identification information is received from the external device in a state where the registration related information associated with the first user identification information in the memory is the permission information, the restriction request is not sent;
receive the registration request including first print setting information from the external device via the communication interface in the state where the registration related information associated with the first user identification information in the memory is the permission information; and
in a first case where the first user identification information and the registration request are received from the external device and the registration related information associated with the first user identification information in the memory is the permission information, register the first print setting information included in the registration request to the memory in association with the first user identification information,
wherein in a second case where the first user identification information is received from the external device and the registration related information associated with the first user identification information in the memory is the restriction information, the first print setting information is not registered to the memory.

9. The printer as in claim 8, wherein the controller is further configured to:
receive first capability information request from the external device via the communication interface, the first capability information request being for requesting sending of capability information indicating a capability of the printer; and
in a case where the first capability information request is received from the external device, send the capability information to the external device via the communication interface,
wherein in a case where a first predetermined operation is performed on the external device after the capability information has been sent to the external device, the registration request including the first user identification information is received from the external device.

10. The printer as in claim 8, wherein the controller is further configured to:
receive an access request for requesting an access to a web server in the printer from the external device via the communication interface; and
in a case where the access request is received from the external device, send acceptance screen data to the external device via the communication interface, the acceptance screen data representing an acceptance screen for accepting an input of user identification information, wherein in a case where the first user identification information is inputted to the acceptance screen after the acceptance screen data has been sent to the external device, the first user identification information is received from the external device; and in a case where the first user identification information is received from the external device and a second predetermined operation is performed on the external device, the registration request is received from the external device.

11. The printer as in claim 8, wherein the memory is further configured to store a permission print condition corresponding to a specific setting item in association with the first user identification information, and the permission print condition is a print condition that a user identified by the first user identification information is permitted to use, wherein in the first case where a specific printing condition that is included in the first print setting information and corresponds to the specific setting item is included in the permission print condition associated with the first user identification information, the first print setting information is registered in the memory in association with the first user identification information, wherein in the first case where the specific print condition is not included in the permission print condition, the first print setting information is not registered in the memory.

12. The printer as in claim 11, wherein the controller is further configured to:

in the first case where the specific print condition is not included in the permission print condition, send selection screen data to the external device via the communication interface, the selection screen data representing a selection screen for selecting whether registration is required; and after the selection screen data has been sent to the external device, receive selection result information indicating a selection result on the selection screen from the external device via the communication interface, wherein in a case where the selection result indicated by the selection result information indicates that registration is required, second print setting information obtained by using the first print setting information is registered in the memory in association with the first user identification information, wherein in a case where the selection result indicates that registration is not required, the second print setting information is not registered in the memory.

13. The printer as in claim 12, wherein in the case where the selection result indicates that registration is required, the second print setting information obtained by replacing the specific print condition included in the first print setting information with the permission print condition is registered in the memory.

14. The printer as in claim 8, wherein the memory is further configured to store a permission print condition corresponding to a specific setting item in association with the first user identification information, and the permission print condition is a print condition that a user identified by the first user identification information is permitted to use, wherein in the first case, the first print setting information is registered in the memory regardless of whether a specific print condition corresponding to the specific setting item included in the first print setting information is included in the permission print condition associated with the first user identification information, wherein the controller is further configured to:

after the first print setting information has been registered in the memory in association with the first user identification information, receive capability information request including the first user identification information from the external device via the communication interface, the capability information request being for requesting sending of capability information indicating a capability of the printer;

in a case where the capability information request is received from the external device and the specific print condition is included in the permission print condition associated with the first user identification information included in the capability information request, send the capability information and the first print setting information to the external device via the communication interface; and in a case where the capability information request is received from the external device and the specific print condition is not included in the permission print condition, send the capability information to the external device via the communication interface without sending the first print setting information to the external device.

15. The printer as in claim 8, wherein the first print setting information is information sent to the external device for the printer to execute printing according to an Internet Printing Protocol (IPP).

16. A printer comprising:

a memory configured to store, for each of one or more user identification information, the user identification information, registration related information which is related to registration of print setting information and authority information in association with each other, the registration related information being either of permission information indicating that registration of the print setting information is permitted or restriction information indicating that registration of the print setting information is restricted, the authority information being either of administrator information indicating that a user is an administrator of the printer or general information indicating that the user is a general user other than the administrator of the printer;

a communication interface; and a controller configured to:

receive first user identification information from an external device via the communication interface;

receive a registration request including first print setting information from the external device via the communication interface, the registration request being for requesting registration of print setting information to the memory; and in a first case where the first user identification information and the registration request are received from the external device, the registration related information associated with the first user identification information among the one or more user identification information in the memory is the permission information and the authority information associated with the first user identification information in the memory is the general information, register the first print setting information included in the registration request in the memory in association with the first user identification information, wherein in a second case where the first user identification information and the registration request are received from the external device, the registration related information associated with the first user identification information in the memory is the restriction information and the authority information associated with the first user identification information in the memory is the general information, the first print setting information is not registered in the memory, the memory is further configured to store a permission print condition corresponding to a specific setting item in association with the first user identification information, and the permission print condition is a print condition that a user, identified by the first user identification information, is permitted to use, wherein in the first case, the first print setting information is registered in the memory regardless of whether a specific print condition corresponding to the specific setting item included in the first print setting information is included in the permission print condition associated with the first user identification information, wherein the controller is further configured to:

after the first print setting information has been registered in the memory in association with the first user identification information, receive capability information request including the first user identification information from the external device via the communication interface, the capability information request being for requesting sending of capability information indicating a capability of the printer;

in a case where the capability information request is received from the external device and the specific print condition is included in the permission print condition associated with the first user identification information included in the capability information request, send the capability information and the first print setting information to the external device via the communication interface; and in a case where the capability information request is received from the external device and the specific print condition is not included in the permission print condition, send the capability information to the external device via the communication interface without sending the first print setting information to the external device.

17. The printer as in claim 16, wherein the controller is further configured to:

receive first capability information request from the external device via the communication interface, the first capability information request being for requesting sending of capability information indicating a capability of the printer; and in a case where the first capability information request is received from the external device, send the capability information to the external device via the communication interface, wherein in a case where a first predetermined operation is performed on the external device after the capability information has been sent to the external device, the registration request including the first user identification information is received from the external device.

18. The printer as in claim 16, wherein the controller is further configured to:

receive an access request for requesting an access to a web server in the printer from the external device via the communication interface; and in a case where the access request is received from the external device, send acceptance screen data to the external device via the communication interface, the acceptance screen data representing an acceptance screen for accepting an input of user identification information, wherein in a case where the first user identification information is inputted to the acceptance screen after the acceptance screen data has been sent to the external device, the first user identification information is received from the external device; and in a case where the first user identification information is received from the external device and a second predetermined operation is performed on the external device, the registration request is received from the external device.

19. The printer as in claim 16, wherein the first print setting information is information sent to the external device for the printer to execute printing according to an Internet Printing Protocol (IPP).

* * * * *